(12) United States Patent
Nishita

(10) Patent No.: US 11,754,677 B2
(45) Date of Patent: Sep. 12, 2023

(54) MEASUREMENT DEVICE

(71) Applicant: Topcon Corporation, Tokyo (JP)

(72) Inventor: Nobuyuki Nishita, Tokyo (JP)

(73) Assignee: Topcon Corporation, Tokyo (JP)

( * ) Notice: Subject to any disclaimer, the term of this patent is extended or adjusted under 35 U.S.C. 154(b) by 541 days.

(21) Appl. No.: 16/830,187

(22) Filed: Mar. 25, 2020

(65) Prior Publication Data

US 2020/0309912 A1    Oct. 1, 2020

(30) Foreign Application Priority Data

Mar. 26, 2019    (JP) .................................. 2019-058442

(51) Int. Cl.
*G01S 7/48* (2006.01)
*G01S 17/89* (2020.01)
*G01S 17/42* (2006.01)

(52) U.S. Cl.
CPC ............ *G01S 7/4808* (2013.01); *G01S 17/42* (2013.01); *G01S 17/89* (2013.01)

(58) Field of Classification Search
CPC ......... G01S 7/4808; G01S 17/42; G01S 17/89
See application file for complete search history.

(56) References Cited

U.S. PATENT DOCUMENTS

| 9,053,547 | B2 | 6/2015 | Kitamura et al. |
| 2014/0037194 | A1 | 2/2014 | Kitamura et al. |
| 2014/0314308 | A2 | 10/2014 | Kitamura et al. |
| 2018/0106615 | A1* | 4/2018 | Ohtomo ................. G01S 17/42 |

FOREIGN PATENT DOCUMENTS

| JP | H03125926 | A | 5/1991 |
| JP | H09113265 | A | 5/1997 |
| JP | 2007170820 | A | 7/2007 |
| JP | 2016035403 | A | 3/2016 |
| JP | 2016161445 | A | 9/2016 |
| JP | 2016186488 | A | 10/2016 |
| JP | 2016206025 | A | 12/2016 |
| JP | 2018009394 | A | 1/2018 |
| JP | 2018-066571 | A | 4/2018 |
| JP | 2018054290 | A | 4/2018 |

OTHER PUBLICATIONS

Notice of Reasons for Refusal dated Dec. 21, 2022 in connection with Japanese Patent Application No. 2019-058442, 9 pgs. (with translation).

* cited by examiner

*Primary Examiner* — Yuen Wong
(74) *Attorney, Agent, or Firm* — CHIESA SHAHINIAN & GIANTOMASI PC

(57) ABSTRACT

Disclosed is a measurement device including: a distance measurement unit that has a light-generating element, a measurement light emission unit, a light reception unit, and a light reception element and measures a distance to a measurement target on the basis of a light reception signal; a deflection unit that is capable of performing scanning with measurement light; and a control unit that controls the distance measurement unit and the deflection unit. The control unit finds a surface of the measurement target, generates a grid having lines that are arranged at regular intervals on the surface of the measurement target and include a component parallel to a reference direction and a component perpendicular to the reference direction, and controls a deflection behavior of the deflection unit so that a scanning track of the measurement light traces the lines of the grid.

13 Claims, 13 Drawing Sheets

MEASUREMENT DEVICE

CROSS-REFERENCE TO RELATED APPLICATIONS

This application claims priority to Japanese Patent Application No. 2019-058442, filed Mar. 26, 2019, the disclosure of which is incorporated herein by reference in its entirety.

BACKGROUND OF THE INVENTION

1. Field of the Invention

The present invention relates to a measurement device.

2. Description of the Related Art

On the sites of civil engineering, building, or the like, examination of the concrete construction of floors or the like is, for example, performed. Examples of the examination of concrete construction include the detection of three-dimensional coordinate at a certain position of concrete surfaces. Alternatively, examples of the examination of concrete construction include the distance measurement, shape measurement, or the like of concrete buildings. In the examination of concrete construction, rod levels, three-dimensional laser scanner devices, or the like are, for example, used.

For example, when measuring the height of a concrete surface using a rod level, an operator traces an arbitrary grid and measures the height of each point. Therefore, measurement using a rod level causes a problem that a measurement operation is complicated and requires much time.

Japanese Patent Application Laid-open No. 2018-66571 discloses an example of a three-dimensional laser scanner device. The three-dimensional laser scanner device like a laser scanner described in Japanese Patent Application Laid-open No. 2018-66571 can perform scanning along the rotation directions of two axes which are in a vertical direction and a horizontal direction by continuously applying a distance measurement laser beam at a constant angular interval in the vertical direction and by rotating the body thereof in the horizontal direction. However, when the examination of concrete construction is performed using the three-dimensional scanner device, the point density of obtained distance measurement data could become sparse as a distance from the laser scanner to a measurement target increases since the distance measurement laser beam is applied at the constant angular interval in the vertical direction. As a result, there is a problem that the uniform examination of concrete construction cannot be performed. Further, there is also a problem that the post-processing operation of a large amount of distance measurement data is required, and that examination time including time required for the post-processing operation becomes large.

SUMMARY OF THE INVENTION

The present invention has been made in order to solve the above problems and has an object of providing a measurement device that is capable of performing uniform examination and reduce examination time.

The above problems are solved by a measurement device according to the present invention. The measurement device includes: a distance measurement unit that has a light-generating element that generates measurement light, a measurement light emission unit that emits the measurement light, a light reception unit that receives reflection measurement light, and a light reception element that receives the reflection measurement light and generates a light reception signal and measures a distance to a measurement target on the basis of the light reception signal from the light reception element; a deflection unit that is capable of performing scanning with the measurement light; and a control unit that controls the distance measurement unit and the deflection unit. The control unit finds a surface of the measurement target, generates a grid having lines that are arranged at regular intervals on the surface of the measurement target and include a component parallel to a reference direction and a component perpendicular to the reference direction, and controls a deflection behavior of the deflection unit so that a scanning track of the measurement light traces the lines of the grid.

According to the measurement device of the present invention, the control unit finds the surface of a measurement target and generates the grid having the lines arranged at regular intervals on the surface of the measurement target. The lines of the grid include the component parallel to the reference direction and the component perpendicular to the reference direction. Further, the control unit controls the deflection behavior of the deflection unit so that the scanning track of the measurement light traces the lines of the grid. Thus, the measurement device according to the present invention is capable of acquiring point group data (deliverables) that is an aggregate of three-dimensional coordinates related to, for example, the surface of a measurement target such as concrete at regular intervals on the surface of the measurement target. Therefore, the measurement device according to the present invention is capable of performing uniform examination on the surface of the measurement target. Further, since the measurement device according to the present invention capable of performing uniform examination on the surface of the measurement target, the measurement device is capable of creating a heat map or the like that is easily visualized even when the heat map or the like is created directly using acquired point group data. Therefore, the measurement device can shorten the time required for a data processing operation after point group data is acquired, and can shorten the examination time including time for a post-processing operation.

In the measurement device according to the present invention, the deflection unit is preferably capable of performing scanning with the measurement light in a circumferential direction in relation to a prescribed center while deflecting an emission direction of the measurement light in relation to a reference optical axis.

According to the measurement device of the present invention, the deflection unit enables scanning such that the scanning track of the measurement light becomes a circle (circle scanning). Thus, the control unit is capable of recognizing the surface of the measurement target with higher accuracy and creating the grid having the lines including the component parallel to the reference direction and the component perpendicular to the reference direction with higher accuracy.

In the measurement device according to the present invention, the control unit preferably sets a direction of the reference optical axis as the reference direction.

According to the measurement device of the present invention, the control unit sets, as the reference direction, the direction of the reference optical axis that matches an optical axis or a light reception optical axis when the emission direction of the measurement light is not deflected by the deflection unit. That is, the reference optical axis is a straight optical axis that passes through the center of the deflection unit. Therefore, the direction of the reference optical axis corresponds to a direction in which the measurement device is oriented. Further, on the basis of the direction in which the measurement device is oriented, the control unit generates the grid having the lines including the component parallel to the direction (reference direction) of the reference optical axis and the component perpendicular to the direction of the reference optical axis. Therefore, the measurement device according to the present invention is capable of tracing the lines of the grid generated on the basis of the direction in which the measurement device is oriented (the direction of the reference optical axis) and acquiring point group data at regular intervals on the surface of the measurement target. Therefore, for example, a horizontal angle detector such as a horizontal encoder that detects a rotation angle in a horizontal direction about a rotation axis extending in a vertical direction may not be necessarily provided. Therefore, the measurement device according to the present invention is capable of performing uniform examination on the surface of the measurement target and shortening examination time with a simple configuration.

In the measurement device according to the present invention, the control unit preferably finds a direction of a lateral surface adjacent to the surface of the measurement target and sets the direction of the lateral surface as the reference direction.

According to the measurement device of the present invention, the control unit sets the direction of the lateral surface adjacent to the surface of the measurement target as the reference direction. Therefore, the control unit generates the grid having the lines including the component parallel to the direction (reference direction) of the lateral surface and the component perpendicular to the direction of the lateral surface on the basis of the direction of the lateral surface. Therefore, the measurement device according to the present invention is capable of tracing the lines of the grid generated on the basis of not only the direction in which the measurement device is oriented (the direction of the reference optical axis) but also the direction of the lateral surface adjacent to the measurement target, and is capable of acquiring point group data at regular intervals on the surface of the measurement target. Therefore, the measurement device according to the present invention is capable of performing uniform examination on the surface of the measurement target and shortening the examination time.

In the measurement device according to the present invention, the control unit preferably finds a direction of a lateral surface while finding the surface of the measurement target by scanning a range crossing a boundary between the surface of the measurement target and the lateral surface adjacent to the surface of the measurement target with the measurement light, and sets the direction of the lateral surface as the reference direction.

According to the measurement device of the present invention, the control unit scans the range crossing the boundary between the surface of the measurement target and the lateral surface adjacent to the surface of the measurement target with the measurement light. Further, the control unit finds the surface of the measurement target and sets the direction of the lateral surface as the reference direction. As described above, the control unit can find the surface of the measurement target and the setting of the reference direction in a single scanning operation. Thus, the measurement device is capable of further shortening the examination time.

In the measurement device according to the present invention, the control unit preferably further finds the direction of the lateral surface while finding an opposite surface opposed to the surface of the measurement target by further scanning a range crossing a boundary between the lateral surface and the opposite surface with the measurement light, and sets the direction of the lateral surface as the reference direction.

According to the measurement device of the present invention, scanning the boundary between the surface of the measurement target and the lateral surface but also in the range crossing the boundary between the lateral surface and the opposite surface opposed to the surface of the measurement target is further performed with the measurement light. For example, when the surface of the measurement target is a floor surface, the opposite surface opposed to the surface of the measurement target is a ceiling surface. Therefore, the measurement device according to the present invention is capable of tracing the lines of the grid generated on the basis of the direction of the lateral surface adjacent to the opposite surface and acquiring point group data at regular intervals on the opposite surface with respect to both the surface of the measurement target and the opposite surface opposed to the surface of the measurement target. Thus, the measurement device is capable of performing uniform examination on the opposite surface opposed to the surface of the measurement target as well and shortening examination time. For example, the measurement device is capable of performing examination on a targeted measurement spot as in the case of the measurement of the diameter of a pipe arranged along an opposite surface such as a ceiling surface or a lateral surface such as a wall surface and is capable of shortening the examination time.

In the measurement device of the present invention, the control unit preferably sets, as the reference direction, a direction of a line connecting a first point on the surface of the measurement target that is selected to find the surface of the measurement target and a second point on the surface of the measurement target that is selected at a position apart from the first point.

According to the measurement device of the present invention, the control unit generates the grid having the lines including the arbitrary components regardless of, for example, the direction in which the measurement device is oriented (the direction of the reference optical axis), the direction of the lateral surface adjacent to the measurement surface, or the like. Therefore, the measurement device according to the present invention is capable of tracing the lines of the grid generated on the basis of the direction of the line connecting the arbitrarily-selected first and second points and is capable of acquiring point group data at regular intervals on the surface of the measurement target. Therefore, the measurement device according to the present invention is capable of acquiring point group data at regular intervals on the surface of the measurement target even on, for example, a site where the lateral surface or the like adjacent to the surface of the measurement target is not installed. Thus, the measurement device according to the present invention is capable of performing uniform examination on the surface of the measurement target and of shortening examination time even on, for example, a site where the lateral surface or the like adjacent to the measurement target is not installed.

The measurement device according to the present invention preferably further includes: an imaging unit that acquires an image of the surface of the measurement target. Further, the control unit calculates a vanishing point of a boundary between the surface of the measurement target and a lateral surface adjacent to the surface of the measurement target and a boundary between an opposite surface opposed to the surface of the measurement target and the lateral surface on the basis of the image acquired by the imaging unit, finds a direction of the lateral surface while finding the surface of the measurement target and the opposite surface on the basis of the vanishing point, and sets the direction of the lateral surface as the reference direction.

According to the measurement device of the present invention, the control unit calculates the vanishing point of the boundary between the surface of the measurement target and the lateral surface adjacent to the surface of the measurement target and the boundary between the opposite surface opposed to the surface of the measurement target and the lateral surface adjacent to the surface of the measurement target on the basis of the image of the surface of the measurement target that has been acquired by the imaging unit. Further, the control unit finds the direction of the lateral surface while finding the surface of the measurement target and the opposite surface on the basis of the calculated vanishing point and sets the direction of the lateral surface as the reference direction. Thus, the control unit is capable of tracing the lines of the grid generated on the basis of the direction of the lateral surface and acquiring point group data at regular intervals on the surface of the measurement target and the opposite surface with respect to the surface of the measurement target and the opposite surface that have been found on the basis of the vanishing point. Thus, by calculating the vanishing point, the control unit is capable of performing uniform examination on the surface of the measurement target and the opposite surface and shortening the examination time. For example, the measurement device is capable of performing examination on a targeted measurement spot like the measurement of the diameter of a pipe arranged along an opposite surface such as a ceiling surface or a lateral surface such as a wall surface and is capable of shortening examination time.

According to the present invention, it is possible to provide a measurement device that is capable of performing uniform examination and reducing examination time.

DESCRIPTION OF THE PREFERRED EMBODIMENTS

Figure 1:
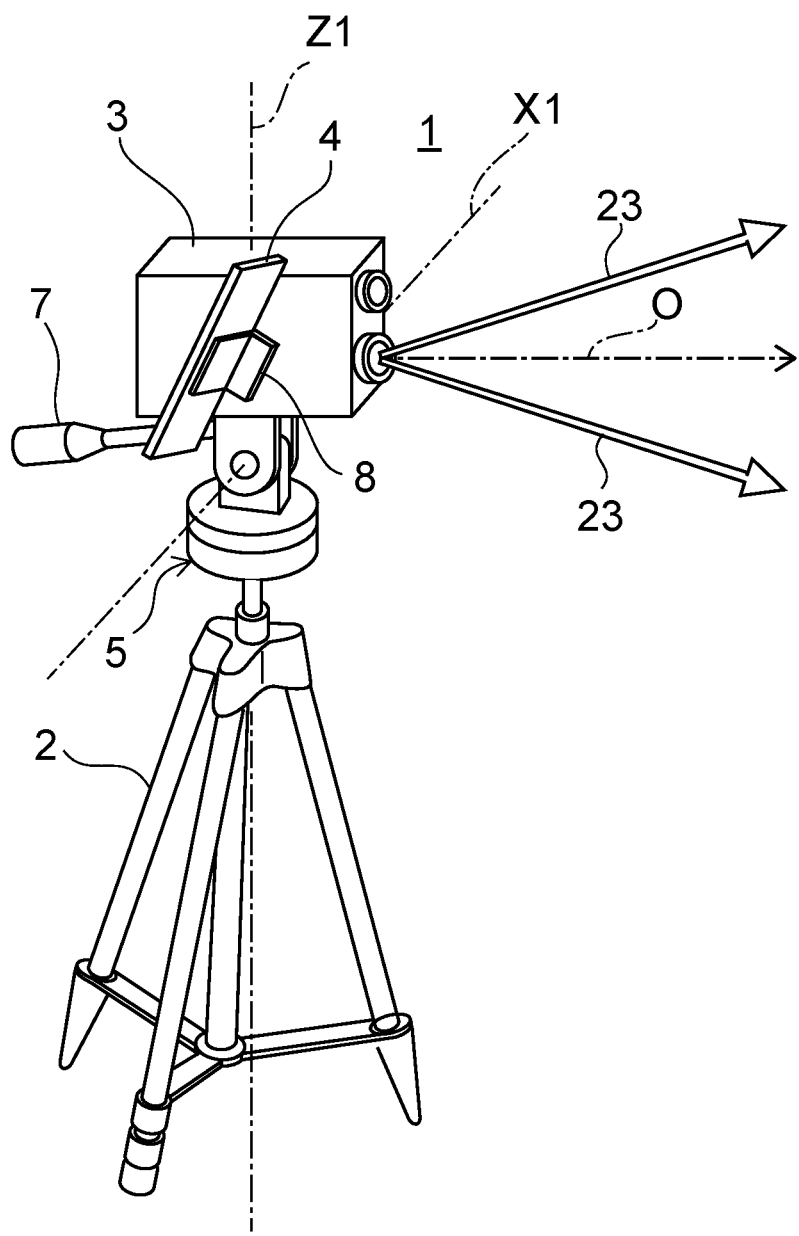
FIG. 1 is a perspective view showing a measurement system according to the present embodiment.

Hereinafter, preferred embodiments of the present invention will be described in detail with reference to the drawings. Note that since the following embodiments are suitable specific examples of the present invention, various technically preferred limitations are added. However, the scope of the present invention is not limited to these modes unless it is particularly described that the present invention is limited to the modes. Further, in the respective drawings, the same constituting elements will be denoted by the same reference numerals, and detailed descriptions thereof will be omitted as occasion demands.

First, the outline of a measurement system (measurement device) according to the present embodiment will be described with reference to FIG. 1. A measurement system 1 according to the present embodiment is an example of the measurement device of the present invention. An optical axis O in FIG. 1 shows an optical axis that has not been deflected by a deflection unit 35, to be described later. The optical axis that has not been deflected by the deflection unit 35 is a straight optical axis that passes through the center of the deflection unit 35 and corresponds to a reference optical axis.

The measurement system 1 mainly includes a tripod 2 serving as a support device, a laser scanner 3, an operation device 4, and a turntable 5. The turntable 5 is attached to the upper end of the tripod 2. The laser scanner 3 is attached to the turntable 5 so as to be rotatable horizontally and vertically.

The turntable 5 is provided with a lever 7 extending in a horizontal direction. By operating the lever 7, an operator can rotate the laser scanner 3 in a top-bottom direction (vertical direction) or a lateral direction (horizontal direction) and fix the laser scanner 3 in a required attitude.

Figure 2:
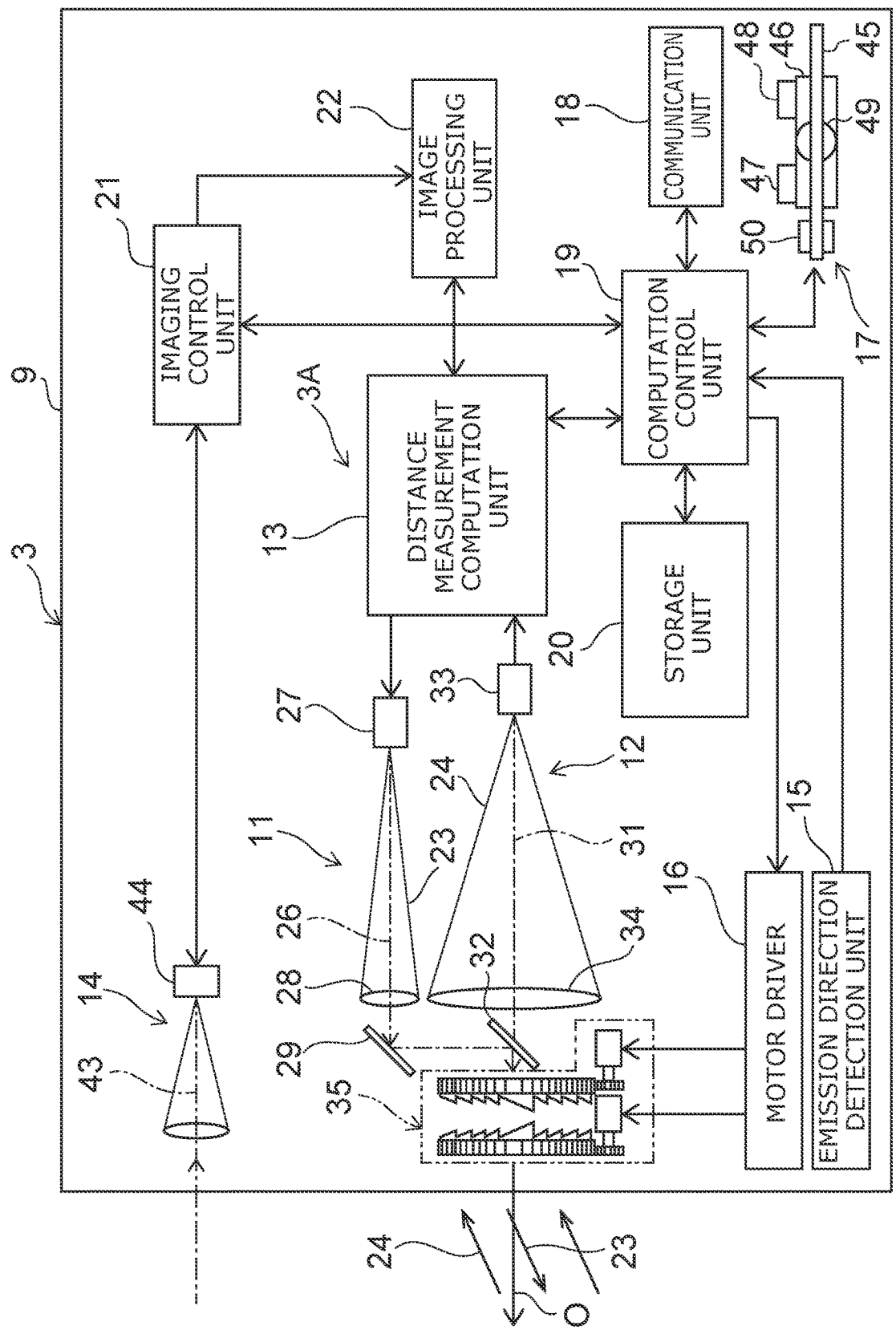
FIG. 2 is a schematic configuration diagram showing a laser scanner of the present embodiment.

The laser scanner 3 includes a distance measurement unit 3A (see FIG. 2) and an attitude detection unit 17 (see FIG. 2). The distance measurement unit 3A emits measurement light 23 to a measurement target or a measurement range and receives reflection measurement light 24 (see FIG. 2) to perform measurement. Further, the attitude detection unit 17 is capable of detecting the vertical (or horizontal) attitude of the laser scanner 3 with high accuracy.

The operation device 4 has a communication function to perform communication with the laser scanner 3 by required means such as a wired line or a wireless line. Further, the operation device 4 is attachable to and detachable from the laser scanner 3 via an attachment 8. The operator can hold and operate the detached operation device 4 with one hand and remotely operate the laser scanner 3 with the operation device 4.

In addition, the laser scanner 3 transmits images, measurement states, measurement results, or the like to the operation device 4. The images, measurement states, measurement results, or the like transmitted from the laser scanner 3 are stored in the operation device 4 and displayed on a display unit 4a (see FIG. 3) of the operation device 4. The operation device 4 may be, for example, a smartphone.

The laser scanner 3 will be described with reference to FIG. 2. The laser scanner 3 includes a measurement light emission unit 11, a light reception unit 12, a distance measurement computation unit 13, an imaging unit 14, an emission direction detection unit 15, a motor driver 16, the attitude detection unit 17, a communication unit 18, a computation control unit 19, a storage unit 20, an imaging control unit 21, and an image processing unit 22. These units are accommodated in a housing 9 and integrated with each other. Note that the measurement light emission unit 11, the light reception unit 12, the distance measurement computation unit 13, or the like constitutes at least a part of the distance measurement unit 3A. Further, the computation control unit 19 of the present embodiment is an example of the control unit of the present invention.

The measurement light emission unit 11 has an emission optical axis 26. A light-generating element 27 such as a laser diode (LD) is provided on the emission optical axis 26. Further, a floodlight lens 28 is provided on the emission optical axis 26. In addition, the emission optical axis 26 is deflected so as to correspond to the light reception optical axis 31 by a first reflection mirror 29 that is provided on the emission optical axis 26 and serves as a deflection optical member and a second reflection mirror 32 that is provided on the light reception optical axis 31 (to be described later) and serves as a deflection optical member. The first reflection mirror 29 and the second reflection mirror 32 constitute at least a part of an emission optical axis deflection unit. The light-generating element 27 generates measurement light and emits pulsed laser light. The measurement light emission unit 11 emits the pulsed laser light emitted from the light-generating element 27 as the measurement light 23.

The light reception unit 12 will be described. The reflection measurement light 24 from a measurement target (that is, a measurement point) is incident on the light reception unit 12. The light reception unit 12 has the light reception optical axis 31. As described above, the emission optical axis 26 that has been deflected by the first reflection mirror 29 and the second reflection mirror 32 corresponds to the light reception optical axis 31.

The deflection unit 35 (to be described later) is disposed on the deflected emission optical axis 26, that is, on the light reception optical axis 31. A straight optical axis that passes through the center of the deflection unit 35 is the reference optical axis O. The reference optical axis O corresponds to the emission optical axis 26 that has not been deflected by the deflection unit 35 or the light reception optical axis 31.

On the light reception optical axis 31 that has passed through the deflection unit 35 and has been incident, an image formation lens 34 and a light reception element 33 such as a photodiode (PD) are provided. The image formation lens 34 forms an image of the reflection measurement light 24 on the light reception element 33. The light reception element 33 receives the reflection measurement light 24 and generates a light reception signal. The light reception signal is input to the distance measurement computation unit 13. The distance measurement computation unit 13 measures a distance to a measurement point on the basis of the light reception signal.

Here, the deflection unit 35 will be described with reference to FIG. 3. The deflection unit 35 has a pair of optical prisms 36a and 36b. The optical prisms 36a and 36b have a disc shape, are arranged to be orthogonal to the light reception optical axis 31, are overlapped with each other, and are arranged parallel to each other. As the optical prisms 36a and 36b, Risley prisms are preferably used to miniaturize the device. The central part of the deflection unit 35 serves as a measurement light deflection part 35a that is a first deflection part through which the measurement light 23 passes and from which the measurement light 23 is emitted. A part other than the central part of the deflection unit 35 serves as a reflection measurement light deflection part 35b that is a second deflection part through which the reflection measurement light 24 passes and on which the reflection measurement light 24 is incident.

The Risley prisms used as the optical prisms 36a and 36b respectively have prism elements 37a and 37b and a multiplicity of prism elements 38a and 38b that are formed to be parallel to each other, and show a disc shape. The optical prisms 36a and 36b, the respective prism elements 37a and 37b, and the prism elements 38a and 38b have the same optical characteristics.

The prism elements 37a and 37b constitute the measurement light deflection part 35a. The prism elements 38a and 38b constitute the reflection measurement light deflection part 35b. The Risley prisms may be made of optical glass but may also be molded by an optical plastic material. In a case in which the Risley prisms are molded by an optical plastic material, it is possible to manufacture the Risley prisms at a low cost.

Each of the optical prisms 36a and 36b is disposed to be independently and separately rotatable about the light reception optical axis 31. The optical prisms 36a and 36b deflect the measurement light 23 that passes through the emission optical axis 26 in an arbitrary direction and deflect the received reflection measurement light 24 to be parallel to the light reception optical axis 31 when their rotation directions, rotation amounts, and rotation speeds are independently controlled. Each of the outer shapes of the optical prisms 36a and 36b is a circle centering on the light reception optical axis 31. In consideration of the spread of the reflection measurement light 24, the diameters of the optical prisms 36a and 36b are set so that the optical prisms 36a and 36b can acquire a sufficient amount of the light.

A ring gear 39a is provided to be fitted on the outer periphery of the optical prism 36a. A ring gear 39b is provided to be fitted on the outer periphery of the optical prism 36b. A drive gear 41a meshes with the ring gear 39a. The drive gear 41a is adhered to the output shaft of a motor 42a. Similarly, a drive gear 41b meshes with the ring gear 39b. The drive gear 41b is adhered to the output shaft of a motor 42b. The motors 42a and 42b are electrically connected to the motor driver 16.

As the motors 42a and 42b, motors that can detect rotation angles or motors that rotate with drive input values such as pulse motors are, for example, used. Alternatively, the rotation amounts of motors may be detected using, for example, rotation angle detectors such as encoders that detect the rotation amounts (rotation angles) of the motors. Each of the rotation amounts of the motors 42a and 42b is detected, and the motors 42a and 42b are separately controlled by the motor driver 16. Note that the encoders directly attached to the ring gears 39a and 39b, respectively, may directly detect the rotation angles of the ring gears 39a and 39b.

The drive gears 41a and 41b and the motors 42a and 42b are provided at positions at which the drive gears 41a and 41b and the motors 42a and 42b do not interfere with the measurement light emission unit 11, for example, at positions below the ring gears 39a and 39b.

The floodlight lens 28, the first reflection mirror 29, the second reflection mirror 32, the measurement light deflection part 35a, or the like constitutes at least a part of a floodlight optical system. The reflection measurement light deflection part 35b, the image formation lens 34, or the like constitutes at least a part of a light reception optical system.

The distance measurement computation unit 13 controls the light-generating element 27 and causes pulsed laser light to be emitted as the measurement light 23. The measurement light 23 is deflected so as to be directed toward a measurement point by the prism elements 37a and 37b (the measurement light deflection part 35a).

The reflection measurement light 24 that has been reflected from a measurement target is incident via the prism elements 38a and 38b (the reflection measurement light deflection part 35b) and the image formation lens 34 and received by the light reception element 33. The light reception element 33 transmits a light reception signal to the distance measurement computation unit 13. The distance measurement computation unit 13 measures a distance to a measurement point (a point to which the measurement light 23 has been applied) for each pulsed light on the basis of the light reception signal from the light reception element 33. Distance measurement data is stored in the storage unit 20. Thus, the distance measurement computation unit 13 can acquire distance measurement data for each measurement point by measuring a distance for each pulsed light while performing scanning with the measurement light 23.

The emission direction detection unit 15 detects the rotation angles of the motors 42a and 42b by counting drive pulses input to the motors 42a and 42b. Alternatively, the emission direction detection unit 15 detects the rotation angles of the motors 42a and 42b on the basis of signals from the encoders. Further, the emission direction detection unit 15 performs the computation of the rotation positions of the optical prisms 36a and 36b on the basis of the rotation angles of the motors 42a and 42b.

In addition, the emission direction detection unit 15 performs the computation of the emission direction of the measurement light 23 on the basis of the refractive indexes and the rotation positions of the optical prisms 36a and 36b and outputs a computation result to the computation control unit 19. The computation control unit 19 is capable of calculating the three-dimensional data of a measurement point by performing computation of a horizontal angle θ1 and a vertical angle θ2 of the measurement point with respect to the reference optical axis O from the emission direction of the measurement light 23 and by associating the horizontal angle θ1 and the vertical angle θ2 with distance measurement data for each measurement point.

The attitude detection unit 17 will be described. The attitude detection unit 17 has a frame 45. The frame 45 is fixed to the housing 9 or a structural member and integrated with the laser scanner 3. A sensor block 46 is attached to the frame 45 via a gimbal. The sensor block 46 is freely rotatable by 360° about two axes orthogonal to each other. A first inclination sensor 47 and a second inclination sensor 48 are attached to the sensor block 46.

The first inclination sensor 47 detects a horizontal level with high accuracy. Examples of the first inclination sensor 47 include an inclination detector that causes detection light to be incident on its horizontal surface and detects a horizontal level with a change in the reflection angle of reflection light. Alternatively, examples of the first inclination sensor 47 include a bubble tube that detects inclination with a change in the positions of contained air bubbles. Further, the second inclination sensor 48 detects a change in inclination with high response, and an acceleration sensor is, for example, used as such. Note that the first inclination sensor 47 and the second inclination sensor 48 may not be necessarily provided.

The relative rotation angle of the sensor block 46 about the two axes with respect to the frame 45 is detected by encoders 49 and 50. Further, a motor (not shown) that rotates the sensor block 46 and horizontally holds the same is provided with respect to the two axes. The motor is controlled by the computation control unit 19 so that the sensor block 46 is horizontally held on the basis of detection results from the first inclination sensor 47 and the second inclination sensor 48.

When the sensor block 46 is inclined (the laser scanner 3 is inclined), a relative rotation angle with respect to the sensor block 46 is detected by the encoders 49 and 50. On the basis of the detection results of the encoders 49 and 50, the inclination angle and the inclination direction of the laser scanner 3 are detected. The sensor block 46 is freely rotatable by 360° about the two axes. Therefore, even if the attitude detection unit 17 is in any attitude (for example, even if the attitude detection unit 17 is turned upside down), the attitude detection unit 17 is capable of detecting attitudes in all directions.

When requested to detect an attitude with high response, the attitude detection unit 17 performs attitude detection and attitude control on the basis of the detection result of the second inclination sensor 48. However, the detection accuracy of the second inclination sensor 48 is generally poorer than the detection accuracy of the first inclination sensor 47. With the provision of the high-accuracy first inclination sensor 47 and the high-response second inclination sensor 48, the attitude detection unit 17 is capable of performing attitude control on the basis of the detection result of the second inclination sensor 48 and performing attitude detection with the first inclination sensor 47.

On the basis of the detection result of the first inclination sensor 47, the attitude detection unit 17 can calibrate the detection result of the second inclination sensor 48. That is, if there occurs a deviation between the values of the encoders 49 and 50 when a horizontal level is detected by the first inclination sensor 47, i.e., if there occurs a deviation between an actual inclination angle and an inclination angle detected by the second inclination sensor 48, the attitude detection unit 17 can calibrate the inclination angle of the second inclination sensor 48 on the basis of the deviation.

Accordingly, by acquiring in advance the relationship between an inclination angle detected by the second inclination sensor 48 and an inclination angle calculated on the basis of a horizontal level detected by the first inclination sensor 47 and the detection results of the encoders 49 and 50, the attitude detection unit 17 can calibrate an inclination angle detected by the second inclination sensor 48 and improve accuracy in detecting an attitude with high response with the second inclination sensor 48.

The computation control unit 19 controls the motor on the basis of a signal from the second inclination sensor 48 when the inclination fluctuates largely and changes fast. Further, the computation control unit 19 controls the motor on the basis of a signal from the first inclination sensor 47 when the inclination fluctuates small and changes slowly, that is, when the first inclination sensor 47 is in a followable state.

Note that comparison data showing the comparison results between the detection results of the first inclination sensor 47 and the detection results of the second inclination sensor 48 is stored in the storage unit 20. The attitude detection unit 17 calibrates the detection result of the second inclination sensor 48 on the basis of the signal from the second inclination sensor 48. By the calibration, the detection result of the second inclination sensor 48 can be increased up to the detection accuracy of the first inclination sensor 47. Accordingly, the attitude detection unit 17 can realize high response while maintaining high accuracy in detecting an attitude.

The imaging unit 14 is a camera that has an imaging optical axis 43 parallel to the reference optical axis O of the laser scanner 3 and has a field angle of, for example, 50☐, and acquires image data including the scanning range of the laser scanner 3. The relationship between the imaging optical axis 43, the emission optical axis 26, and the reference optical axis O is a known matter. Further, the imaging unit 14 is capable of acquiring moving images or continuous images.

The imaging control unit 21 controls the imaging of the imaging unit 14. When the imaging unit 14 captures a moving image or a continuous image, the imaging control unit 21 synchronizes a timing at which a frame image constituting the moving image or the continuous image is acquired and a timing at which scanning is performed by the laser scanner 3. The computation control unit 19 also performs the association between images and point group data.

An imaging element 44 of the imaging unit 14 is a CCD sensor or a CMOS sensor that is an aggregate of pixels. The respective pixels of the imaging element 44 can specify a position on the image element. For example, the respective pixels have pixel coordinates in a coordinate system in which the imaging optical axis 43 is used as the origin. A position on the image element is specified by the pixel coordinates. The image processing unit 22 performs image processing to superimpose information displayed on the operation device 4 on image data acquired by the imaging unit 14, or the like. An image generated by the image processing unit 22 is displayed on the display unit 4a of the operation device 4 by the computation control unit 19.

Figure 4:
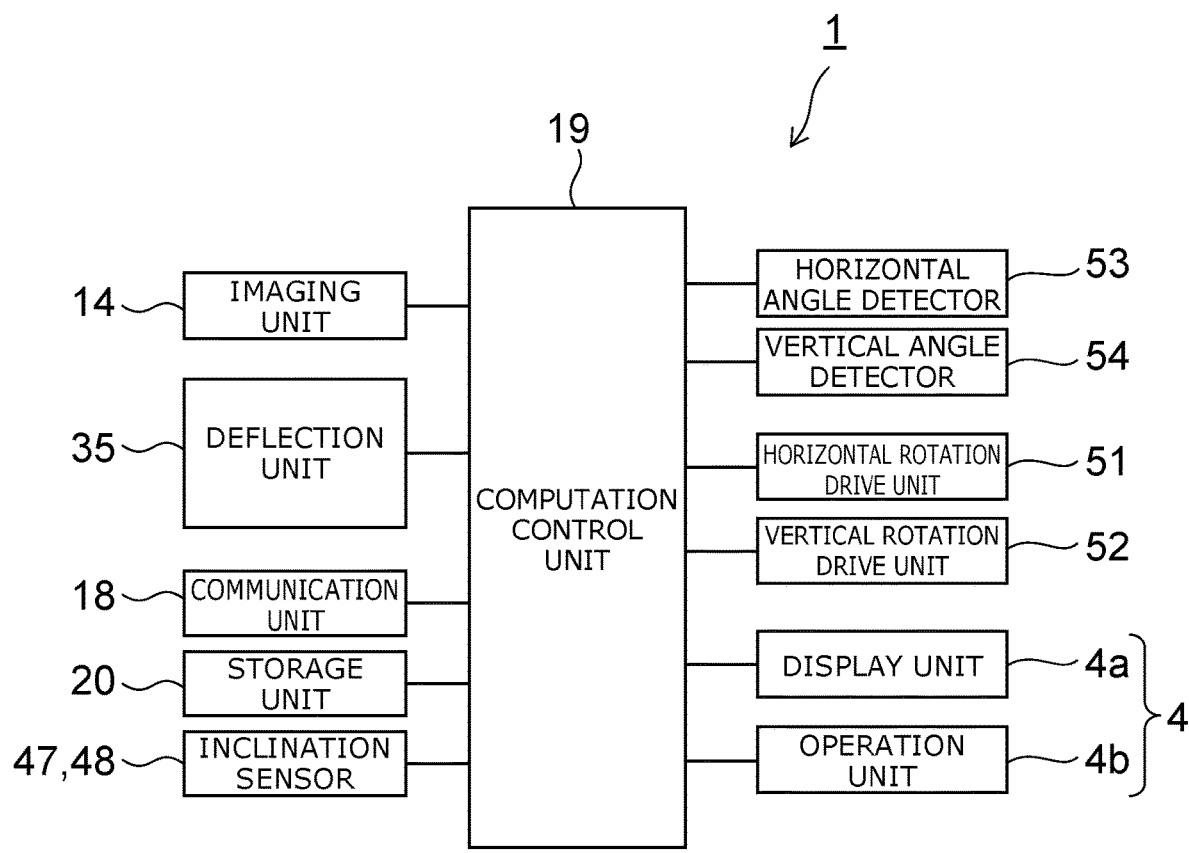
FIG. 4 is a schematic configuration diagram showing the measurement system according to the present embodiment.
Figure 5:
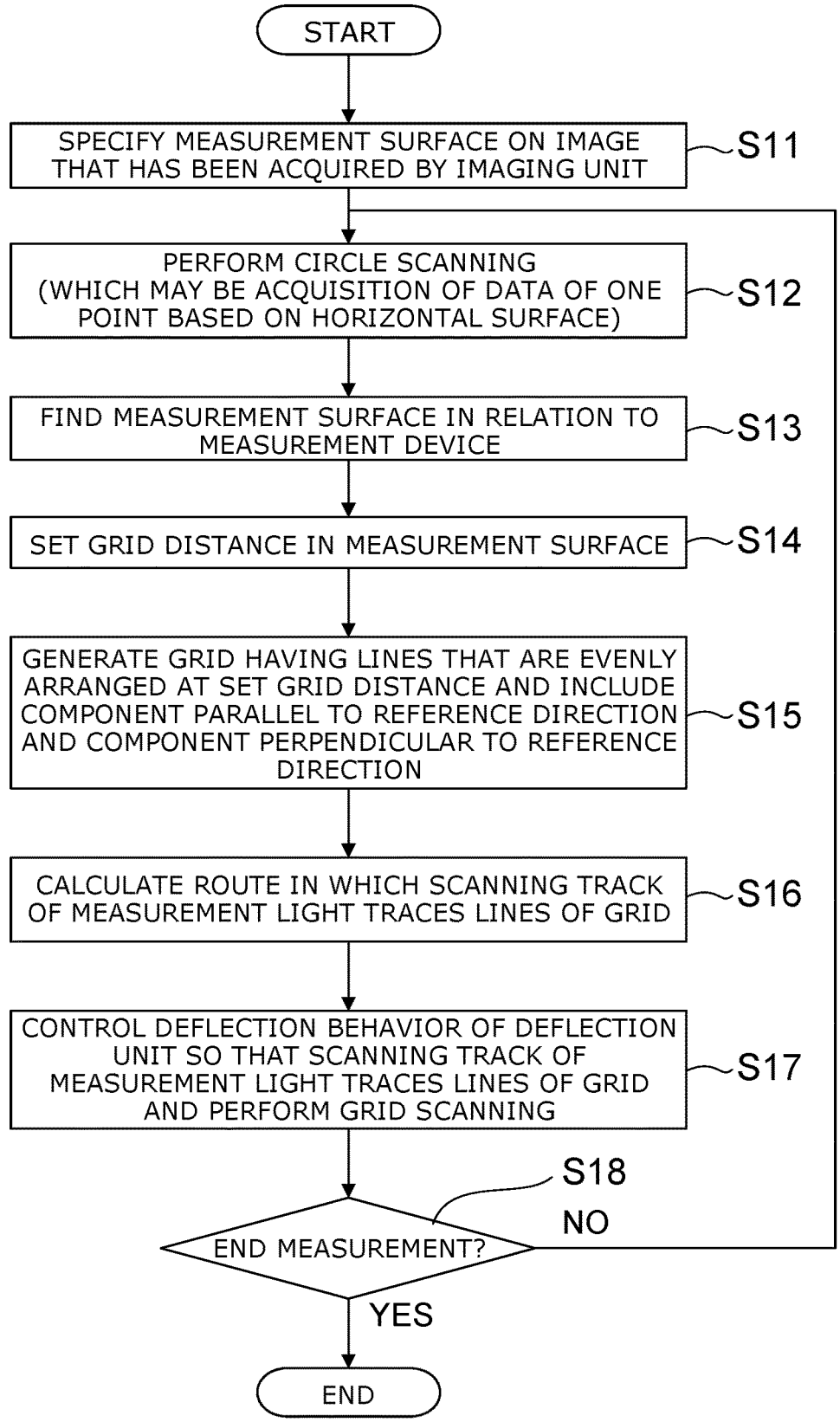
FIG. 5 is a flowchart showing processing performed by a computation control unit of the present embodiment.

The measurement system 1 according to the present embodiment will be further described with reference to FIG. 4. As shown in FIG. 4, the measurement system 1 according to the present embodiment includes a horizontal rotation drive unit 51, a vertical rotation drive unit 52, a horizontal angle detector 53, and a vertical angle detector 54 with respect to the block diagram shown in FIG. 2. Further, the operation device 4 is, for example, a display including a touch panel enabling detecting operator's finger contact or the like and has the display unit 4a and an operation unit 4b.

The horizontal rotation drive unit 51 causes the laser scanner 3 to rotate in the horizontal direction about an axis (vertical axis) Z1 extending in the vertical direction by a drive force generated by a motor (not shown) on the basis of a control signal transmitted from the computation control unit 19. The vertical rotation drive unit 52 causes the laser scanner 3 to rotate in the vertical direction about an axis (horizontal axis) X1 extending in the horizontal direction by a drive force generated by a motor (not shown) on the basis of a control signal transmitted from the computation control unit 19. Note that the measurement system 1 according to the present embodiment may not necessarily include the horizontal rotation drive unit 51 and the vertical rotation drive unit 52.

The horizontal angle detector 53 is a sensor that detects a rotation angle in the horizontal direction of the laser scanner 3 with respect to a reference position in the horizontal direction. The horizontal angle detector 53 detects a rotation angle in the horizontal direction of the laser scanner 3 and transmits the detected rotation angle to the computation control unit 19. The computation control unit 19 controls a position in the horizontal direction of the laser scanner 3 so that the rotation angle in the horizontal direction transmitted from the horizontal angle detector 53 becomes a desired target value.

The vertical angle detector 54 is a sensor that detects a rotation angle in the vertical direction of the laser scanner 3 with respect to a reference position in the vertical direction. The vertical angle detector 54 detects a rotation angle in the vertical direction of the laser scanner 3 and transmits the detected rotation angle to the computation control unit 19. The computation control unit 19 controls a position in the vertical direction of the laser scanner 3 so that the rotation angle in the vertical direction transmitted from the horizontal angle detector 54 becomes a desired target value.

The display unit 4a is a device that displays various information processed by the distance measurement computation unit 13, the image processing unit 22, and the computation control unit 19 to notify the operator of the measurement system 1 of the various information.

The operation unit 4b is a device that receives operations by the operator of the measurement system 1 to input the various settings of the measurement system 1 or instructions to the distance measurement computation unit 13 and the computation control unit 19.

The measurement operation of the laser scanner 3 will be described with reference to FIG. 5 to FIGS. 7A and 7B. First, the tripod 2 is installed at a known point or a prescribed point, and the reference optical axis O is directed toward a measurement target. The horizontal angle of the reference optical axis O at this time is detected by the horizontal angle detection function of the turntable 5, and the inclination angle of the reference optical axis O with respect to the horizontal direction is detected by the attitude detection unit 17.

Next, in step S11, an operator specifies, for example, a surface (measurement surface) 100 of a measurement target such as a concrete surface on an image that has been acquired by the imaging unit 14 and has been displayed on the display unit 4a using the operation unit 4b. The specification of the measurement surface 100 is performed in such a manner that the operator selects a part 102 of the surface (measurement surface) 100 to be measured on the image that has been displayed on the display unit 4a. At this time, the operator may specify an arbitrary point or an arbitrary range of the measurement surface 100 on the image that has been displayed on the display unit 4a. In an example shown in FIGS. 7A and 7B, the operator specifies an arbitrary point as the part 102 of the measurement surface 100.

Then, in step S12, the computation control unit 19 separately controls the motors 42a and 42b with the motor driver 16 and performs scanning (circle scanning) in which a scanning track T1 of the measurement light 23 becomes a circle on the measurement surface 100. That is, by controlling the deflection unit 35, the computation control unit 19 performs scanning with the measurement light 23 in a circumferential direction with respect to a prescribed center while deflecting the emission direction of the measurement light 23 with respect to the reference optical axis O. Further, the computation control unit 19 measures a distance for each pulsed light to acquire the distance measurement data of respective measurement points on the scanning track T1 of the measurement light 23 via the distance measurement computation unit 13 and stores the acquired distance measurement data in the storage unit 20. The deflection operation and the scanning operation of the deflection unit 35 at this time will be further described with reference to FIG. 6.

Figure 6:
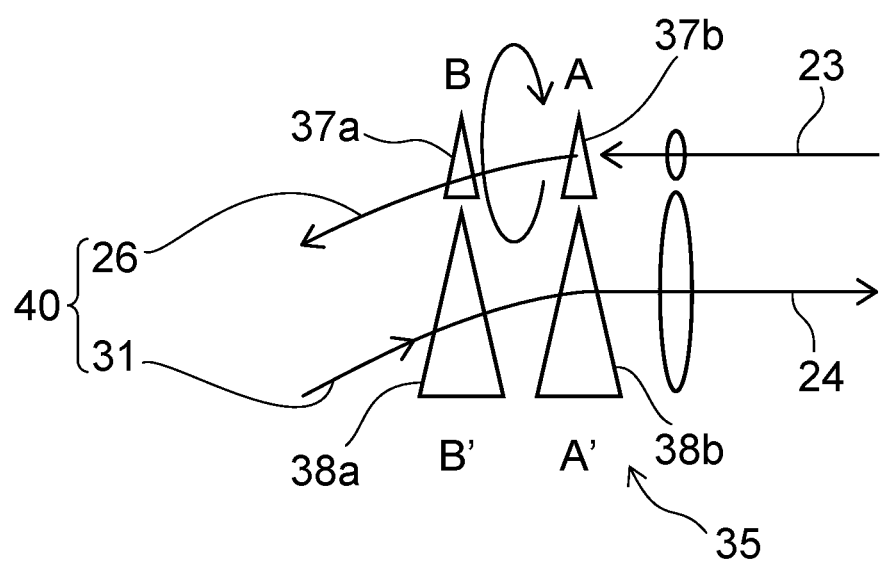
FIG. 6 is an operation description view of the deflection unit of the present embodiment.

Note that the prism elements 37a and 37b and the prism elements 38a and 38b of the optical prisms 36a and 36b are separately shown in FIG. 6 to simplify the description. Further, FIG. 6 shows a state in which the prism elements 37a and 37b and the prism elements 38a and 38b are positioned in the same direction. In this state, a maximum deflection angle is obtained. Further, a minimum deflection angle is obtained in a state in which any one of the optical prisms 36a and 36b is rotated by 180□. That is, the mutual optical functions of the optical prisms 36a and 36b are cancelled each other, and a deflection angle becomes 0□. Accordingly, in this state, the measurement light 23 emitted via the optical prisms 36a and 36b and the reflection measurement light 24 received via the optical prisms 36a and 36b correspond to the reference optical axis O.

The measurement light 23 that has been emitted from the light-generating element 27 is converted into a parallel light flux by the floodlight lens 28, passes through the measurement light deflection part 35a (the prism elements 37a and 37b), and is emitted toward the measurement surface 100. Here, the measurement light 23 is deflected and emitted in a required direction by the prism elements 37a and 37b when passing through the measurement light deflection part 35a. The reflection measurement light 24 that has been reflected by the measurement surface 100 is incident when passing through the reflection measurement light deflection part 35b, and then condensed onto the light reception element 33 by the image formation lens 34.

Figure 3:
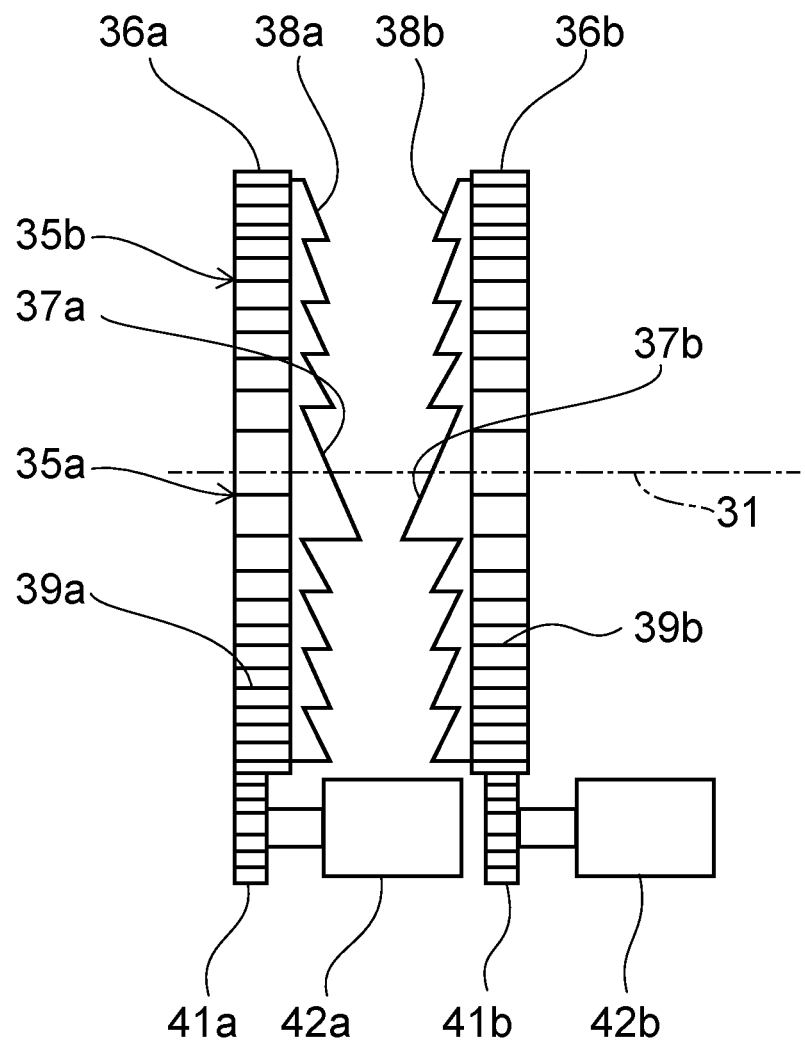
FIG. 3 is a schematic view showing a deflection unit of the present embodiment.

The reflection measurement light 24 is deflected by the prism elements 38a and 38b so as to correspond to the light reception optical axis 31 when passing through the reflection measurement light deflection part 35b (see FIG. 3). By the combination between the rotation positions of the optical prisms 36a and 36b, it is possible to arbitrarily change the deflection direction and the deflection angle of the measurement light 23 that is to be emitted.

Accordingly, by controlling the deflection unit 35 while causing laser light to be emitted from the light-generating element 27, the computation control unit 19 is capable of performing scanning (circle scanning) in which the scanning track T1 of the measurement light 23 becomes a circle. Note that needless to say, the reflection measurement light deflection part 35b integrally rotates with the measurement light deflection part 35a.

In addition, by continuously changing the deflection angle of the deflection unit 35 and performing distance measurement while performing scanning with the measurement light 23, the computation control unit 19 is capable of acquiring distance measurement data (scanning data) along the scanning track T1 of the measurement light 23. Further, about scanning conditions set according to a scanning speed, scanning density, or the like, the scanning speed increases or decreases with an increase or decrease in a rotation speed in a state in which the relationship between the motors 42a and 42b is maintained. It is possible to set the scanning density at a desired value with the control of the relationship between the scanning speed and the pulse light emission cycle of the measurement light 23.

Further, the emission direction angle of the measurement light 23 during measurement is detected on the basis of the rotation angles of the motors 42a and 42b. Further, by associating the emission direction angle during the measurement with distance measurement data, the computation control unit 19 is capable of acquiring three-dimensional distance measurement data. Accordingly, the computation control unit 19 is capable of causing the laser scanner 3 to function as a laser scanner that acquires point group data having three-dimensional position data.

Note that in step S12, the computation control unit 19 does not necessarily perform the circle scanning. For example, when it is presumed that the measurement surface 100 is a substantially horizontal surface, distance measurement data on an arbitrary point in the measurement surface 100 may be acquired.

Next, in step S13, the computation control unit 19 finds the on-site measurement surface 100 with respect to the measurement system 1. Specifically, the computation control unit 19 calculates the direction of a normal line N1 of the apparent measurement surface 100. For example, the computation control unit 19 computes the parameters of the apparent measurement surface 100 to calculate the normal line N1 on the basis of point group data on the measurement surface 100 that has been acquired by the distance measurement computation unit 13 and has been stored in the storage unit 20 in step S12.

Then, in step S14, the computation control unit 19 sets a distance D of a grid 110 in the measurement surface 100. The distance D of the grid 110 set by the computation control unit 19 is an actual distance (actual size) in the measurement surface 100 and is not an apparent distance when seen from the measurement system 1. The distance D of the grid 110 may be input and set by the operator, or may be set on the basis of measurement resolution, a measurement ratio, or the like. Alternatively, the distance D of the grid 110 may be automatically calculated when the operator inputs the size of a measurement target. The distance D of the grid 110 is set at, for example, about 1 m.

Next, in step S15, the computation control unit 19 generates the grid 110 having lines 111 arranged at regular intervals at the distance D in the measurement surface 100. At this time, the lines 111 of the grid 110 include a component 111a parallel to the reference direction and a component 111b perpendicular to the reference direction. As described above, the computation control unit 19 generates the grid 110 having the lines 111 that are arranged at regular intervals at the distance D set in step S14, and that include the component 111a parallel to the reference direction and the component 111b perpendicular to the reference direction.

Figure 7A:
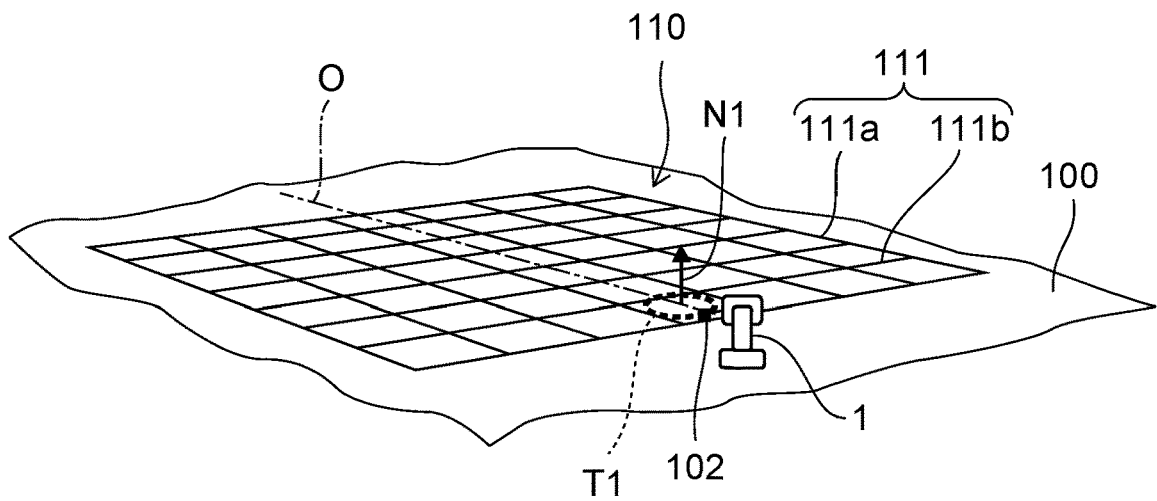
FIGS. 7A and 7B are schematic views for describing the generation of a grid of the present embodiment.
Figure 7B:
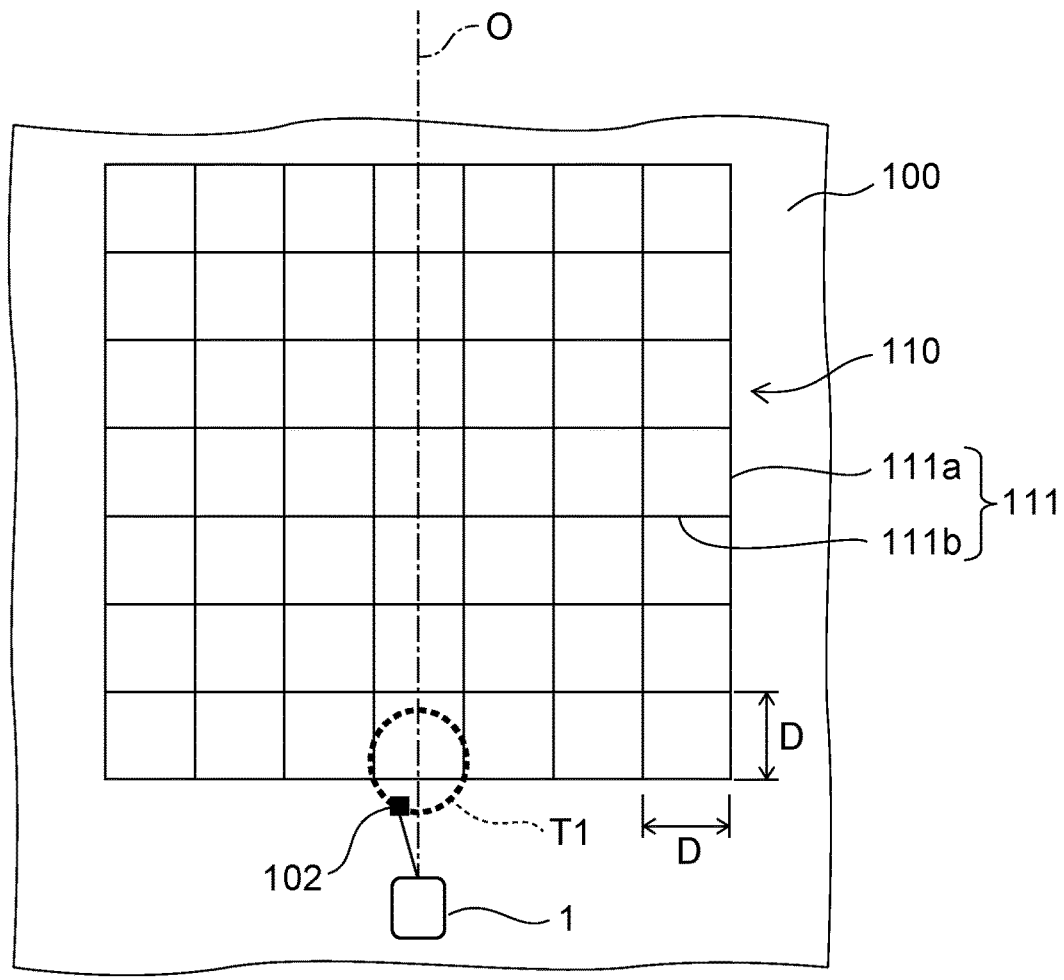

In an example shown in FIGS. 7A and 7B, the computation control unit 19 sets the direction of the reference optical axis O as the reference direction. The reference optical axis O is an optical axis that corresponds to the emission optical axis 26 or the light reception optical axis 31 in a case in which the emission direction of the measurement light 23 has not been deflected by the deflection unit 35, and is a straight optical axis that passes through the center of the deflection unit 35. Therefore, the direction of the reference optical axis O corresponds to a direction at which the measurement system 1 is oriented. Further, the computation control unit 19 generates the grid 110 having the lines 111 that include the component 111a parallel to the direction (reference direction) of the reference optical axis O and the component 111b perpendicular to the direction of the reference optical axis O on the basis of the direction at which the measurement system 1 is oriented.

Then, in step S16, the computation control unit 19 calculates a route in which the scanning track of the measurement light 23 traces the lines 111 of the grid 110 that has been generated in step S15. Next, in step S17, the computation control unit 19 controls the deflection behavior of the deflection unit 35 so that the scanning track of the measurement light 23 traces the lines 111 of the grid 110 that has been generated in step S15 to perform grid scanning on the basis of the route calculated in step S16.

Specifically, by causing the deflection angle of the deflection unit 35 to be continuously changed so that the scanning track of the measurement light 23 traces the lines 111 of the grid 110 and performing distance measurement while performing scanning with the measurement light 23, the computation control unit 19 is capable of acquiring distance measurement data (scan data) along the scanning track (the lines 111 of the grid 110) of the measurement light 23. The distance measurement data (scan data) acquired along the scanning track (the lines 111 of the grid 110) of the measurement light 23 is stored in the storage unit 20.

The emission direction angle of the measurement light 23 during measurement is detected on the basis of the rotation angles of the motors 42a and 42b. Further, the computation control unit 19 acquires point group data that is an aggregate of the three-dimensional coordinates of a plurality of measurement points on the basis of the emission direction angle of the measurement light 23 during the measurement and the distance measurement data of the plurality of measurement points stored in the storage unit 20. Specifically, the computation control unit 19 acquires three-dimensional distance measurement data by associating the emission direction angle during the measurement with the distance measurement data. The computation control unit 19 stores the acquired point group data in the storage unit 20.

Next, in step S18, the computation control unit 19 determines whether to end the measurement. When the measurement is not ended (NO in step S18), the computation control unit 19 performs the processing described above in relation to step S12 again. On the other hand, when the measurement is ended (YES in step S18), the computation control unit 19 ends the measurement operation of the laser scanner 3.

In the measurement system 1 according to the present embodiment, the computation control unit 19 finds the measurement surface 100 and generates the grid 110 having the lines 111 arranged at regular intervals on the measurement surface 100. The lines 111 of the grid 110 include the component 111a parallel to the reference direction and the component 111b perpendicular to the reference direction. Further, the computation control unit 19 controls the deflection behavior of the deflection unit 35 so that the scanning track of the measurement light 23 traces the lines 111 of the grid 110. Thus, the measurement system 1 according to the present embodiment is capable of acquiring point group data (deliverables) that is an aggregate of three-dimensional coordinates related to, for example, the surface (the measurement surface 100) of a measurement target such as concrete at regular intervals on the measurement surface 100. Therefore, the measurement system 1 according to the present embodiment is capable of performing uniform examination on the measurement surface 100. Further, since the measurement system 1 according to the present embodiment is capable of performing uniform examination on the measurement surface 100, the measurement system 1 is capable of creating a heat map or the like that is easily visualized even when creating the heat map or the like directly using acquired point group data. Therefore, the measurement system 1 is capable of shortening time required for a data processing operation after acquiring point group data and shortening the examination time including time for a post-processing operation.

Further, by controlling the deflection unit 35, the computation control unit 19 performs the scanning (circle scanning) in which the scanning track T1 of the measurement light 23 becomes a circle on the measurement surface 100 and finds the measurement surface 100. Thus, the computation control unit 19 can find the measurement surface 100 with higher accuracy and creating the grid 110 having the lines 111 including the component 111a parallel to the reference direction and the component 111b perpendicular to the reference direction with higher accuracy.

Further, in the example shown in FIGS. 7A and 7B, the computation control unit 19 sets, as the reference direction, the direction of the reference optical axis O that corresponds to the emission optical axis 26 or the light reception optical axis 31 in a case in which the emission direction of the measurement light 23 that has not been deflected by the deflection unit 35. That is, the reference optical axis O is a straight optical axis that passes through the center of the deflection unit 35. Therefore, the direction of the reference optical axis O corresponds to a direction in which the measurement system 1 is oriented. Further, on the basis of the direction in which the measurement system 1 is oriented, the computation control unit 19 generates the grid 110 having the lines 111 including the component 111a parallel to the direction (reference direction) of the reference optical axis O and the component 111b perpendicular to the direction of the reference optical axis O. Therefore, the measurement system 1 according to the present embodiment is capable of tracing the lines 111 of the grid 110 generated on the basis of the direction in which the measurement system 1 is oriented (the direction of the reference optical axis O) and acquiring point group data at regular intervals on the measurement surface 100. Therefore, in the example shown in FIGS. 7A and 7B, the horizontal angle detector 53 may not be necessarily provided. Therefore, the measurement system 1 according to the present embodiment is capable of performing uniform examination on the measurement surface 100 and shortening the examination time with a simple configuration.

Next, a modified example of the reference direction set by the computation control unit 19 will be described with reference to the drawings. In the following modified example, the measurement operations of the laser scanner 3 are the same as those of steps S11 to S18 described above in relation to FIG. 5. On the other hand, the reference direction set by the computation control unit 19 in step S15 is different from that described above in relation to FIGS. 7A and 7B. Note that when the constituting elements of a measurement system that will be described below are the same as those of the measurement system 1 described above in relation to FIG. 1 to FIGS. 7A and 7B, their duplicated descriptions will be omitted as occasion demands and only differences will be mainly described below.

First, a first modified example of the reference direction of the present embodiment will be described with reference to FIGS. 8A and 8B. In the present modified example, the computation control unit 19 selects a wall surface or a lateral surface 150 of a column adjacent to the measurement surface 100 and finds a direction A1 of the lateral surface 150 to set the reference direction. The selection of the lateral surface 150 is performed in such a manner that the operator selects a part of the lateral surface 150 on an image that has been displayed on the display unit 4a. At this time, the operator may specify an arbitrary point or an arbitrary range of the lateral surface 150 on the image that has been displayed on the display unit 4a.

Figure 8A:
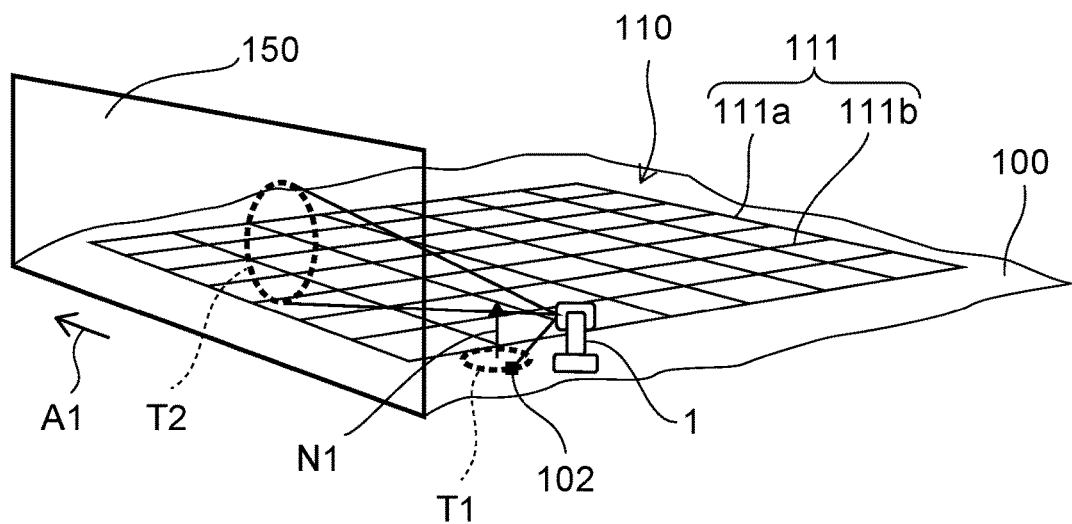
FIGS. 8A and 8B are schematic views for describing a first modified example of a reference direction of the present embodiment.
Figure 8B:
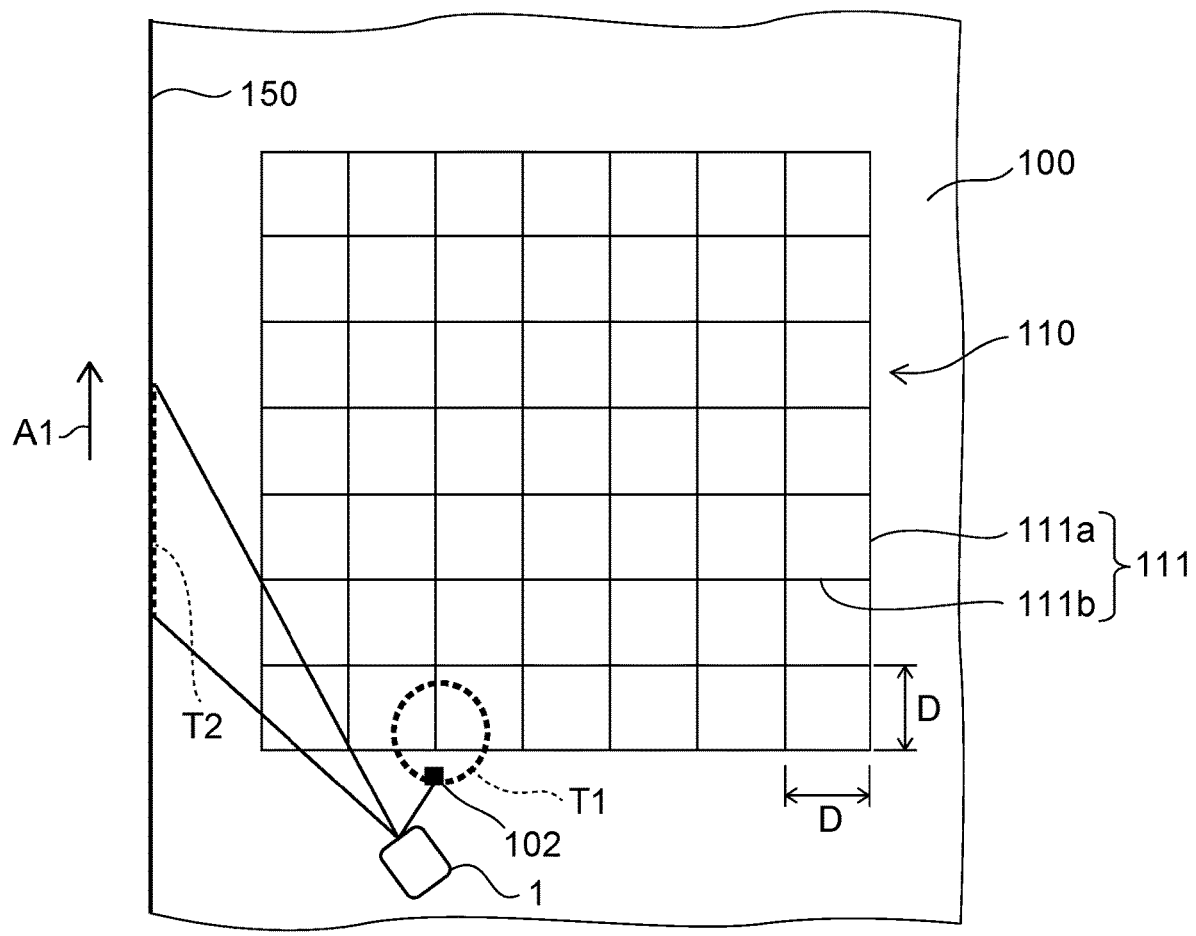

Specifically, as shown in FIGS. 8A and 8B, the computation control unit 19 separately controls the motors 42a and 42b with the motor driver 16 while selecting the wall surface or the lateral surface 150 of the column adjacent to the measurement surface 100, and performs scanning in which a scanning track T2 of the measurement light 23 becomes a circle on the lateral surface 150. Further, the computation control unit 19 performs distance measurement for each pulsed light to acquire the distance measurement data of respective measurement points on the scanning track T2 of the measurement light 23 and stores the acquired distance measurement data in the storage unit 20. Further, the computation control unit 19 acquires three-dimensional distance measurement data in the lateral surface 150 by associating the emission direction angle of the measurement light 23 with the distance measurement data.

In the manner described above, the computation control unit 19 sets the direction A1 of the lateral surface 150 as the reference direction while acquiring the direction A1 of the lateral surface 150. The other measurement operations are the same as those of the laser scanner 3 described above in relation to FIG. 5 to FIGS. 7A and 7B.

According to the present modified example, the computation control unit 19 generates the grid 110 having the lines 111 including the component 111a parallel to the direction A1 (reference direction) of the lateral surface 150 and the component 111b perpendicular to the direction A1 of the lateral surface 150 on the basis of the direction A1 of the lateral surface 150. Therefore, the measurement system 1 according to the present modified example is capable of tracing the lines 111 of the grid 110 generated on the basis of not only a direction in which the measurement system 1 is oriented (the direction of the reference optical axis O) but also the direction A1 of the lateral surface 150 adjacent to the measurement surface 100 and acquire point group data at regular intervals on the measurement surface 100. Therefore, the measurement system 1 according to the present modified example is capable of performing uniform examination on the measurement surface 100 and shortening examination time.

Next, a second modified example of the reference direction of the present embodiment will be described with reference to FIGS. 9A and 9B. In the present modified example, the computation control unit 19 selects a wall surface adjacent to the measurement surface 100 or a lateral surface 150 of a column and finds the direction A1 of the lateral surface 150 while finding the measurement surface 100. The selection of the lateral surface 150 is described above in relation to FIGS. 8A and 8B.

Figure 9A:
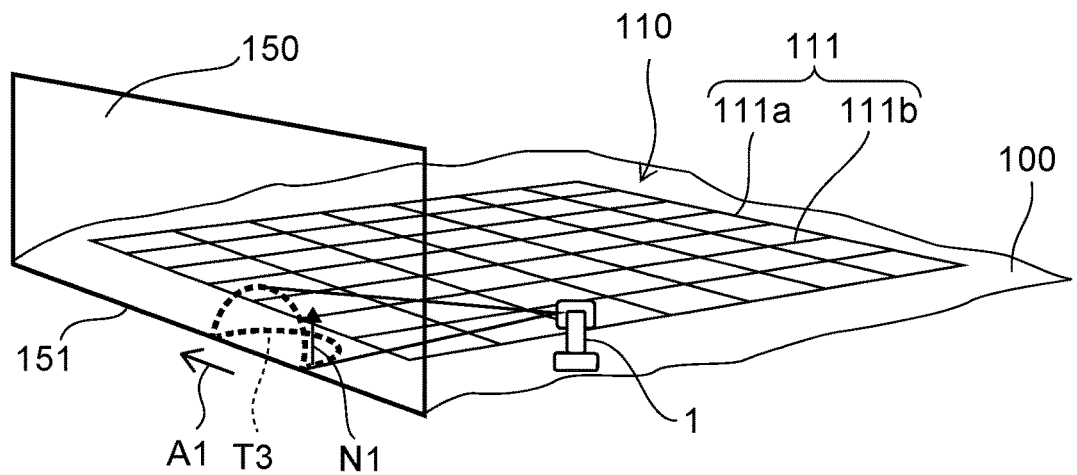
FIGS. 9A and 9B are schematic views for describing a second modified example of the reference direction of the present embodiment.
Figure 9B:
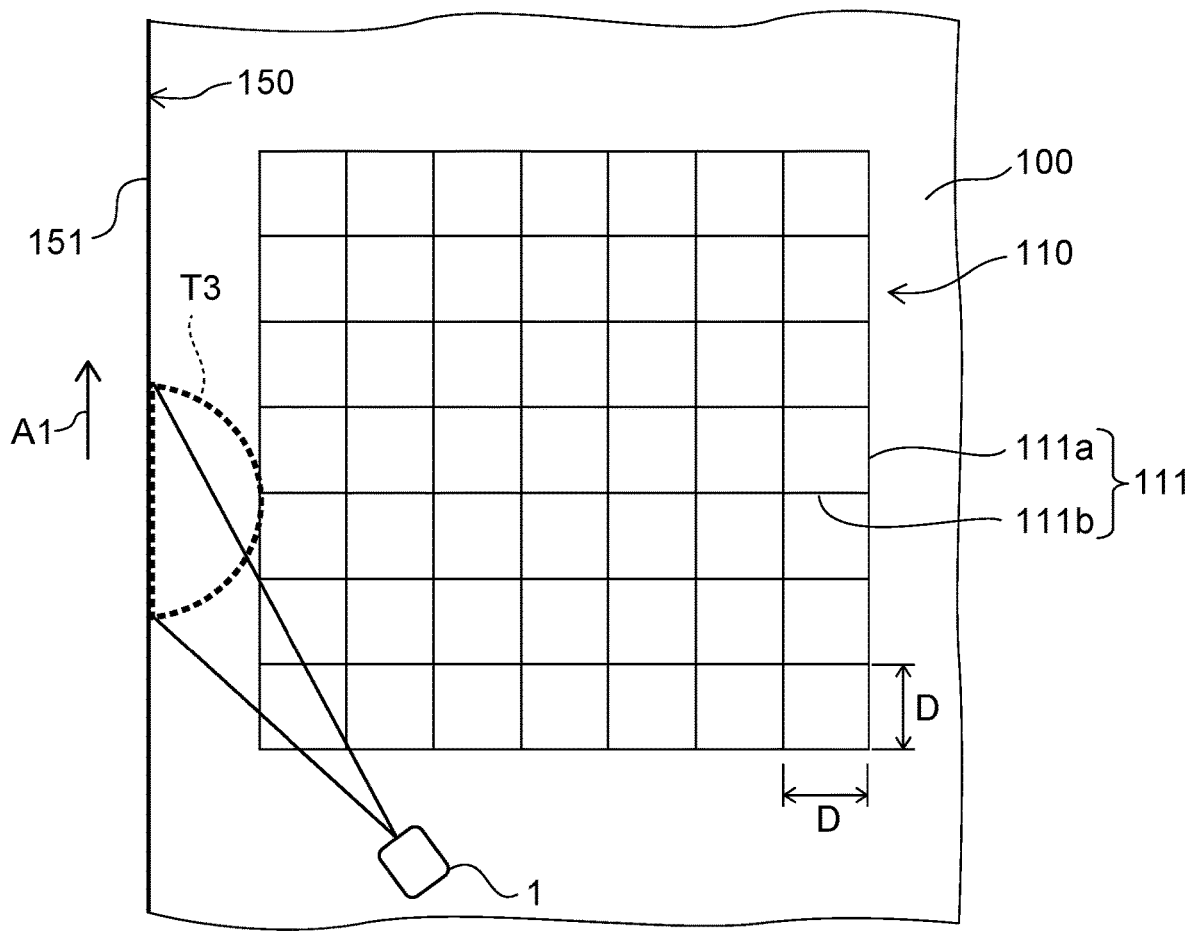

Specifically, as shown in FIGS. 9A and 9B, the computation control unit 19 separately controls the motors 42a and 42b with the motor driver 16 while selecting the wall surface or the lateral surface 150 of the column adjacent to the measurement surface 100, and performs scanning in which a scanning track T3 of the measurement light 23 becomes a circle in a range crossing a boundary 151 between the measurement surface 100 and the lateral surface 150. Further, the computation control unit 19 acquires the distance measurement data of respective measurement points on the scanning track T3 of the measurement light 23 via the distance measurement computation unit 13 by performing distance measurement for each pulsed light and stores the acquired distance measurement data in the storage unit 20. Further, the computation control unit 19 acquires three-dimensional distance measurement data in the measurement surface 100 and the lateral surface 150 by associating the emission direction angle of the measurement light 23 with the distance measurement data.

In the manner described above, the computation control unit 19 acquires the direction A1 of the lateral surface 150 while calculating the direction of the normal line N1 of the apparent measurement surface 100. Further, the computation control unit 19 sets the direction A1 of the lateral surface 150 as the reference direction. The other measurement operations are the same as those of the laser scanner 3 described above in relation to FIG. 5 to FIGS. 7A and 7B.

According to the present modified example, the computation control unit 19 can find the measurement surface 100 and of the setting of the reference direction in a single scanning operation. Therefore, in the present modified example, the processing of steps S12 and S13 described above in relation to FIG. 5 may not be necessarily performed and may be performed at the same timing as a timing at which the direction A1 of the lateral surface 150 is found. Thus, the measurement system 1 according to the present modified example is capable of further shortening the examination time.

Next, a third modified example of the reference direction of the present embodiment will be described with reference to FIGS. 10A, 10B, 11A and 11B. In the present modified example, the computation control unit 19 selects a wall surface or a lateral surface 150 of a column adjacent to the measurement surface 100 and a ceiling surface 160 opposed to the measurement surface 100, and finds the direction A1 of the lateral surface 150 while finding the measurement surface 100 and the ceiling surface 160 to set the reference direction. The ceiling surface 160 of the present embodiment is an example of an "opposite surface" of the present invention. The ceiling surface 160 may also be an example of the "surface of a measurement target", that is, the measurement surface 100 of the present invention. The selection of the lateral surface 150 and the ceiling surface 160 is described above in relation to FIGS. 8A and 8B.

Figure 10A:
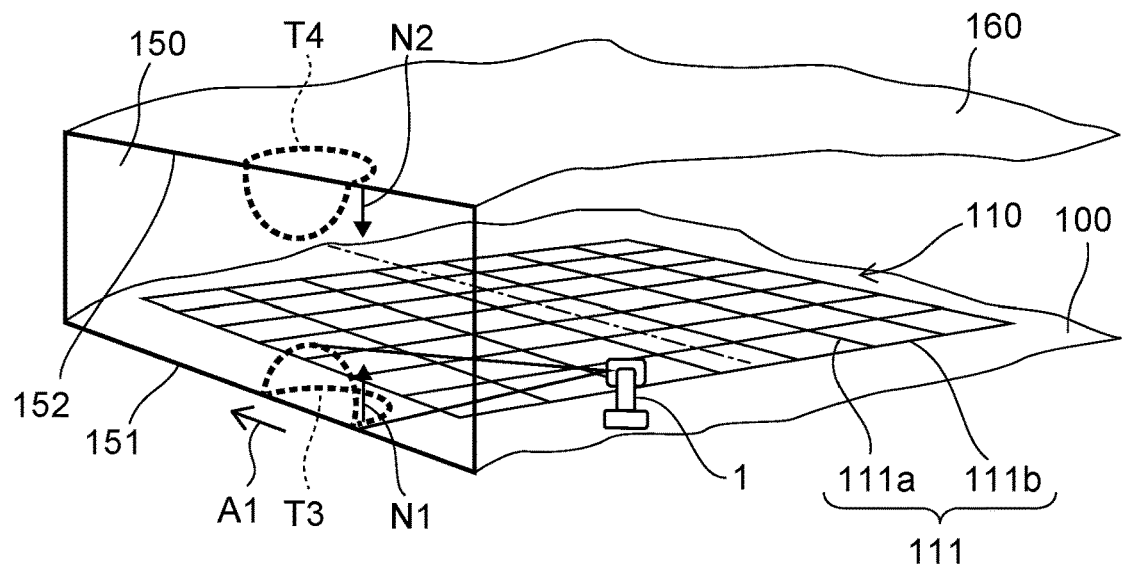
FIGS. 10A and 10B are schematic views for describing a third modified example of the reference direction of the present embodiment.
Figure 10B:
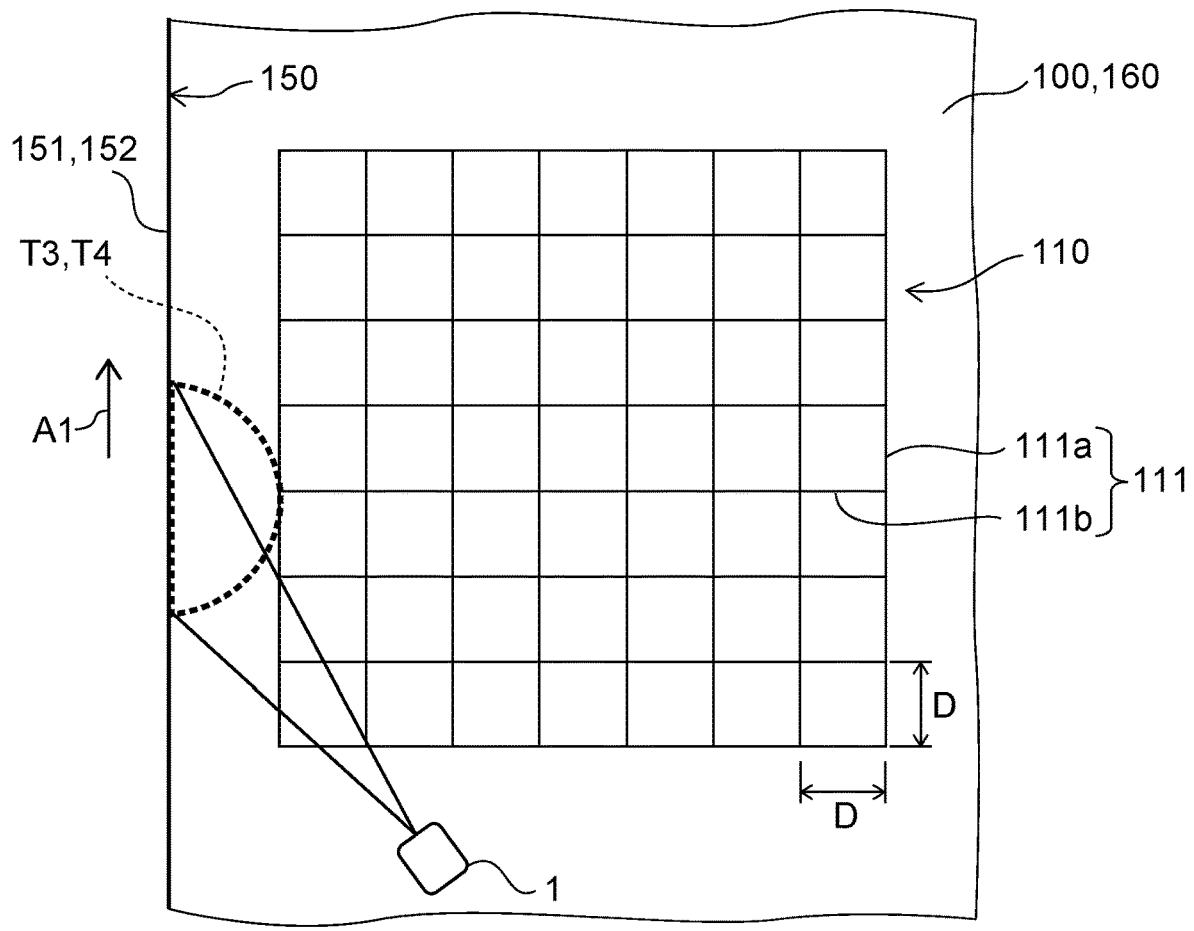

Specifically, as shown in FIGS. 10A and 10B, the computation control unit 19 separately controls the motors 42a and 42b with the motor driver 16 while selecting the wall surface or the lateral surface 150 of the column adjacent to the measurement surface 100, and performs scanning in which the scanning track T3 of the measurement light 23 becomes a circle in a range crossing the boundary 151 between the measurement surface 100 and the lateral surface 150. In addition, the computation control unit 19 separately controls the motors 42a and 42b with the motor driver 16 while selecting the wall surface or the lateral surface 150 of the column adjacent to the ceiling surface 160, and performs scanning in which a scanning track T4 of the measurement light 23 becomes a circle in a range crossing a boundary 152 between the ceiling surface 160 and the lateral surface 150. Further, the computation control unit 19 acquires the distance measurement data of respective measurement points on the scanning track T3 and the scanning track T4 of the measurement light 23 via the distance measurement computation unit 13 by performing distance measurement for each pulsed light and stores the acquired distance measurement data in the storage unit 20. Further, the computation control unit 19 acquires three-dimensional distance measurement data in the measurement surface 100, the lateral surface 150, and the ceiling surface 160 by associating the emission direction angle of the measurement light 23 with the distance measurement data.

Figure 11A:
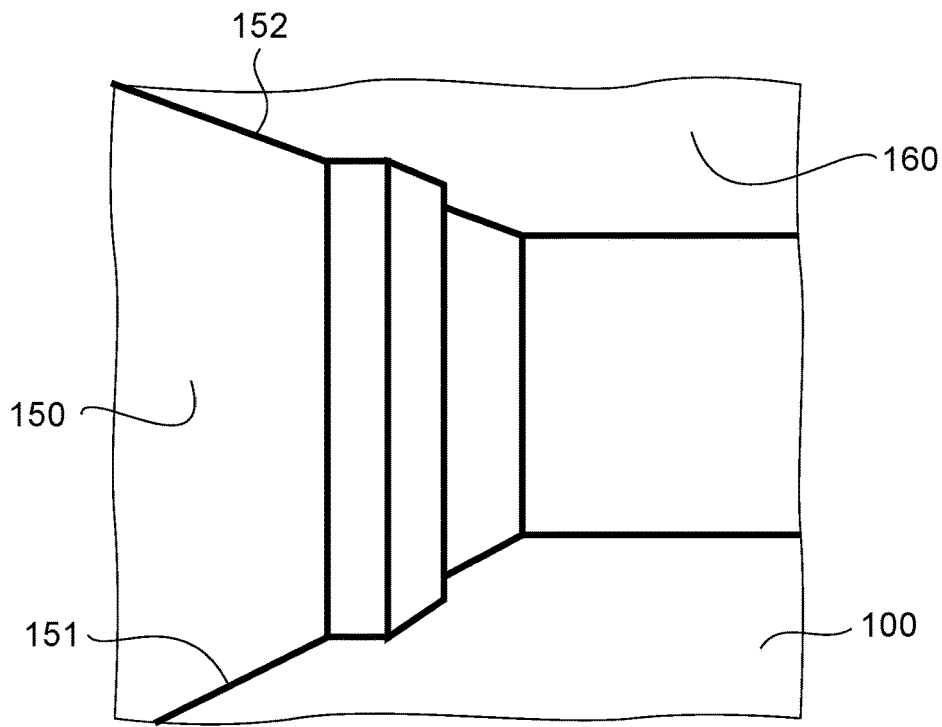
FIGS. 11A and 11B are schematic views for describing the third modified example of the reference direction of the present embodiment.
Figure 11B:
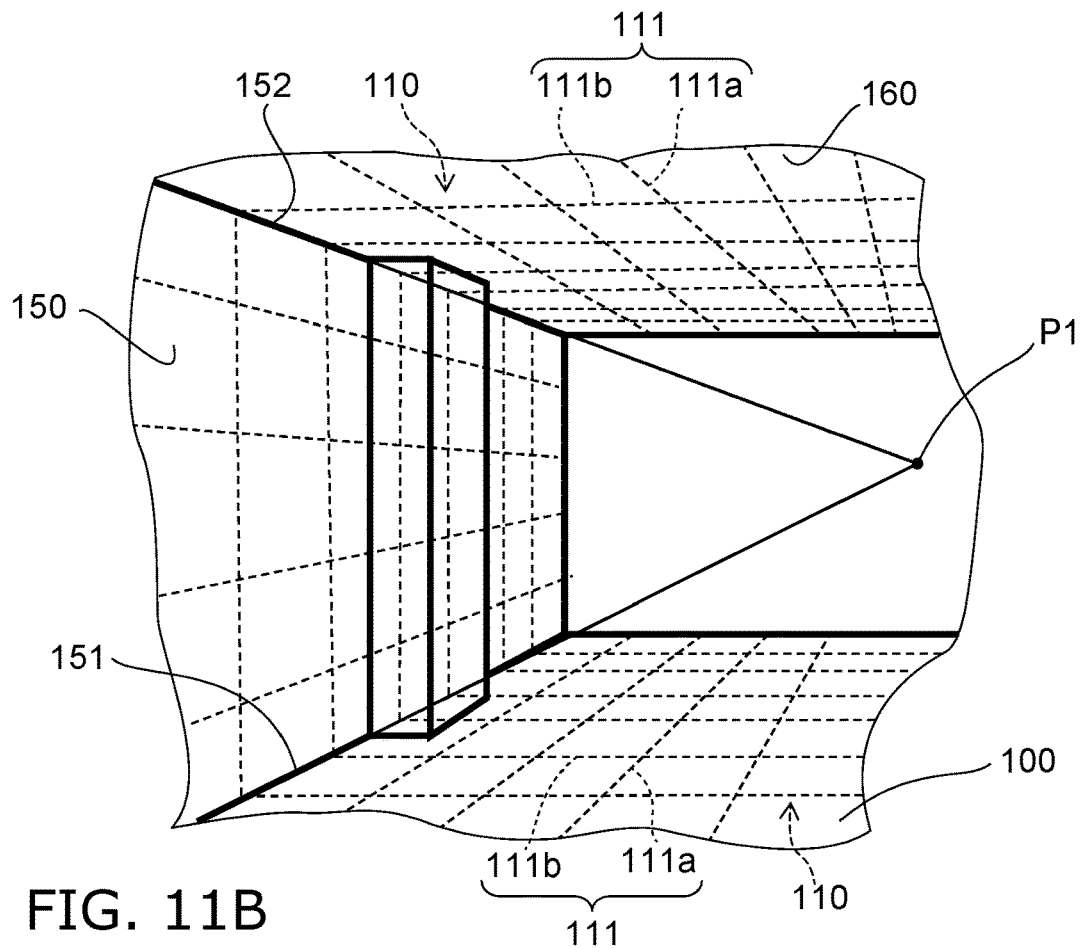

In the manner described above, the computation control unit 19 acquires the direction A1 of the lateral surface 150 while calculating the direction of the normal line N1 of the apparent measurement surface 100 and the direction of a normal line N2 of the apparent ceiling surface 160. Further, the computation control unit 19 sets the direction A1 of the lateral surface 150 as the reference direction. Thus, as shown in FIG. 11B, the computation control unit 19 is capable of generating the grid 110 having the lines 111 arranged at regular intervals at the distance D in the ceiling surface 160. At this time, the lines 111 of the grid 110 include the component 111a parallel to the direction A1 (reference direction) of the lateral surface 150 and the component 111b perpendicular to the reference direction. As described above, the computation control unit 19 is capable of generating, in the measurement surface 100 and the ceiling surface 160, the grid 110 having the lines 111 that are arranged at regular intervals at the distance D and include the component 111a parallel to the reference direction and the component 111b perpendicular to the reference direction.

According to the present modified example, the measurement system 1 is capable of tracing the lines 111 of the grid 110 generated on the basis of the direction A1 of the lateral surface 150 adjacent to the ceiling surface 160 and acquiring point group data at regular intervals on the ceiling surface 160 with respect to both the measurement surface 100 and the ceiling surface 160. Thus, the measurement system 1 according to the present modified example is capable of performing uniform examination on the ceiling surface 160 opposed to the measurement surface 100 as well and shortening the examination time. For example, the measurement system 1 is capable of performing examination on a targeted measurement spot like the measurement of the diameter of a pipe arranged along the ceiling surface 160 or the lateral surface 150 such as a wall surface and shortening the examination time.

Note that the computation control unit 19 may calculate a vanishing point P1 (see FIG. 11B) of the boundary 151 and the boundary 152 and find the direction A1 of the lateral surface 150 while finding the measurement surface 100 and the ceiling surface 160 on the basis of the vanishing point P1 to set the reference direction. This will be described later.

Figure 12A:
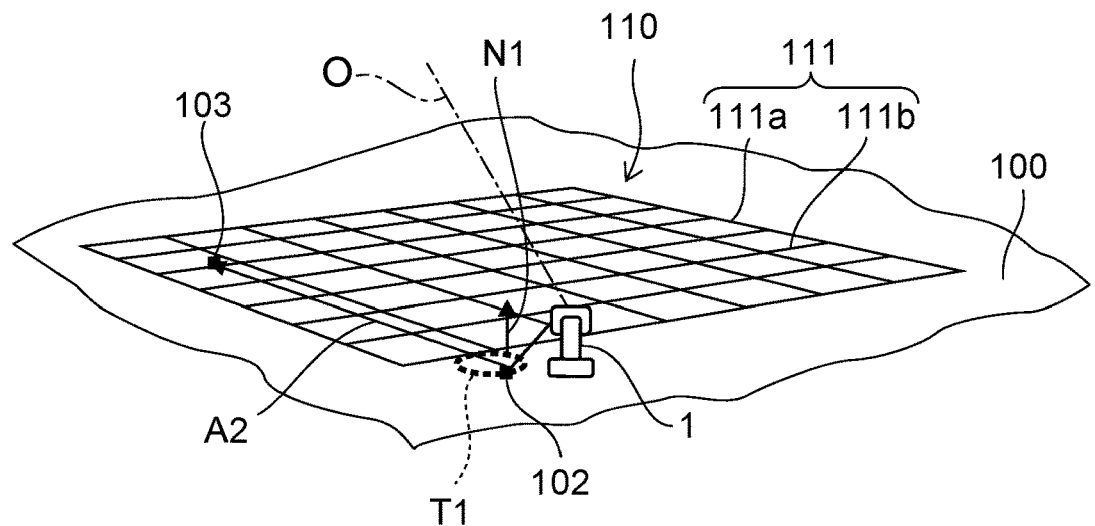
FIGS. 12A and 12B are schematic views for describing a fourth modified example of the reference direction of the present embodiment.
Figure 12B:
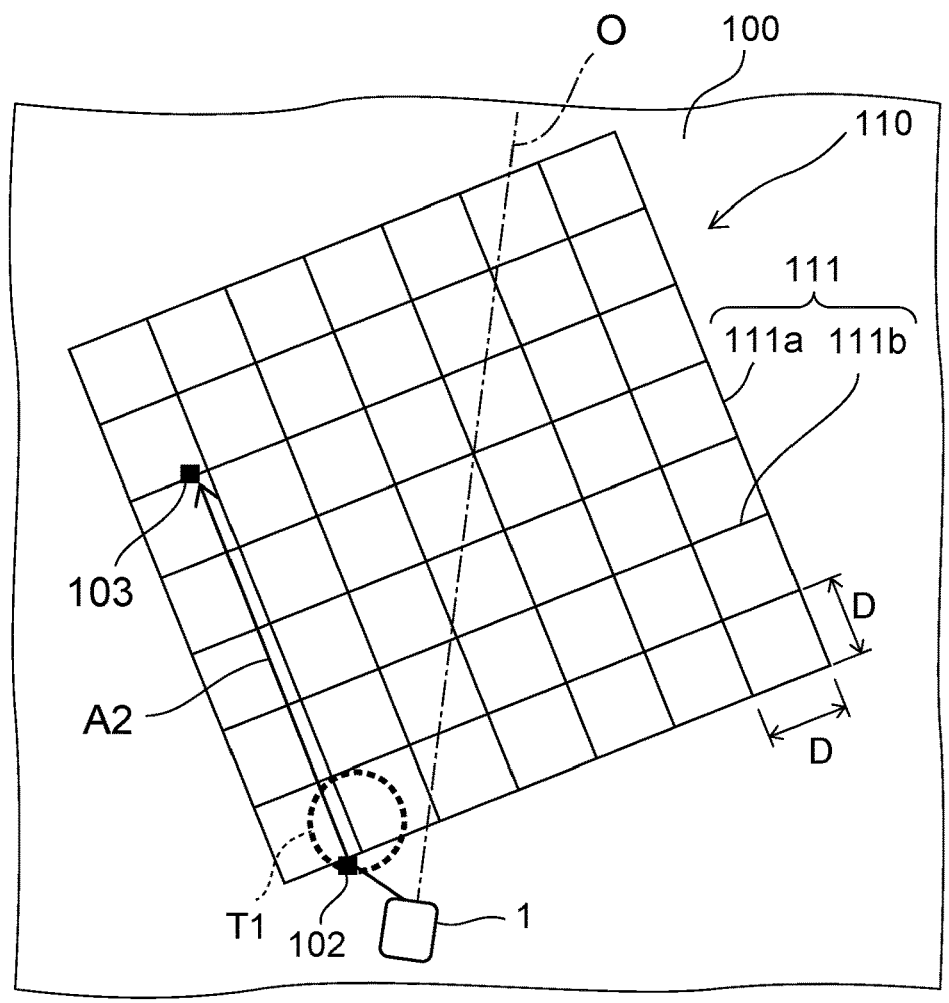

Next, a fourth modified example of the reference direction of the present embodiment will be described with reference to FIGS. 12A and 12B. In the present modified example, the computation control unit 19 further selects another part 103 different from the one part 102 of the measurement surface 100 selected in step S11 (see FIG. 5) and finds a direction A2 of the measurement surface 100 to set the reference direction. In the present modified example, the one part 102 is an example of a "first point" of the present invention. Further, the other part 103 is an example of a "second point" of the present invention.

First, in step S11, the operator specifies, for example, the surface (measurement surface) 100 of a measurement target such as a concrete surface on an image that has been acquired by the imaging unit 14 and has been displayed on the display unit 4a using the operation unit 4b. Next, in steps S12 and S13, the computation control unit 19 separately controls the motors 42a and 42b with the motor driver 16, performs scanning in which the scanning track T1 of the measurement light 23 becomes a circle on the measurement surface 100, and finds the on-site measurement surface 100 with respect to the measurement system 1. The above processing is described above in relation to FIG. 5.

In the present modified example, the computation control unit 19 further selects the other part 103 different from the one part 102 of the measurement surface 100 selected in step S11 to set the reference direction. The selection (specification) of the other part 103 of the measurement surface 100 is performed in such a manner that the operator selects the other part 103 of the measurement surface 100 on the image that has been displayed on the display unit 4a. The computation control unit 19 sets the direction A2 of the measurement surface 100 as the reference direction while finding the direction of a line connecting the one part 102 of the measurement surface 100 and the other part 103 of the measurement surface 100 to each other as the direction A2 of the measurement surface 100. The other measurement operations are the same as those of the laser scanner 3 described above in relation to FIG. 5 to FIGS. 7A and 7B.

According to the present modified example, the computation control unit 19 generates the grid 110 having the lines 111 including the arbitrary components 111a and 111b regardless of, for example, a direction in which the measurement system 1 is oriented (the direction of the reference optical axis O), the direction A1 of the lateral surface 150 adjacent to the measurement surface 100, or the like. For example, the operator is capable of generating the grid 110 on the basis of the intended direction A2 of the measurement surface 100 regardless of the direction of the reference optical axis O, the direction A1 of the lateral surface 150, or the like. Therefore, the measurement system 1 is capable of tracing the lines 111 of the grid 110 generated on the basis of the direction A2 (the direction of the measurement surface) of the line connecting the arbitrarily-selected one part 102 and the other part 103 of the measurement surface 100 to each other and acquiring point group data at regular intervals on the measurement surface 100. Therefore, the measurement system 1 is capable of acquiring point group data at regular intervals on the measurement surface 100 even on, for example, a site where the lateral surface 150 or the like adjacent to the measurement surface 100 is not installed. Thus, the measurement system 1 is capable of performing uniform examination on the measurement surface 100 and shortening the examination time even on, for example, a site where the lateral surface 150 or the like adjacent to the measurement surface 100 is not installed.

Figure 13A:
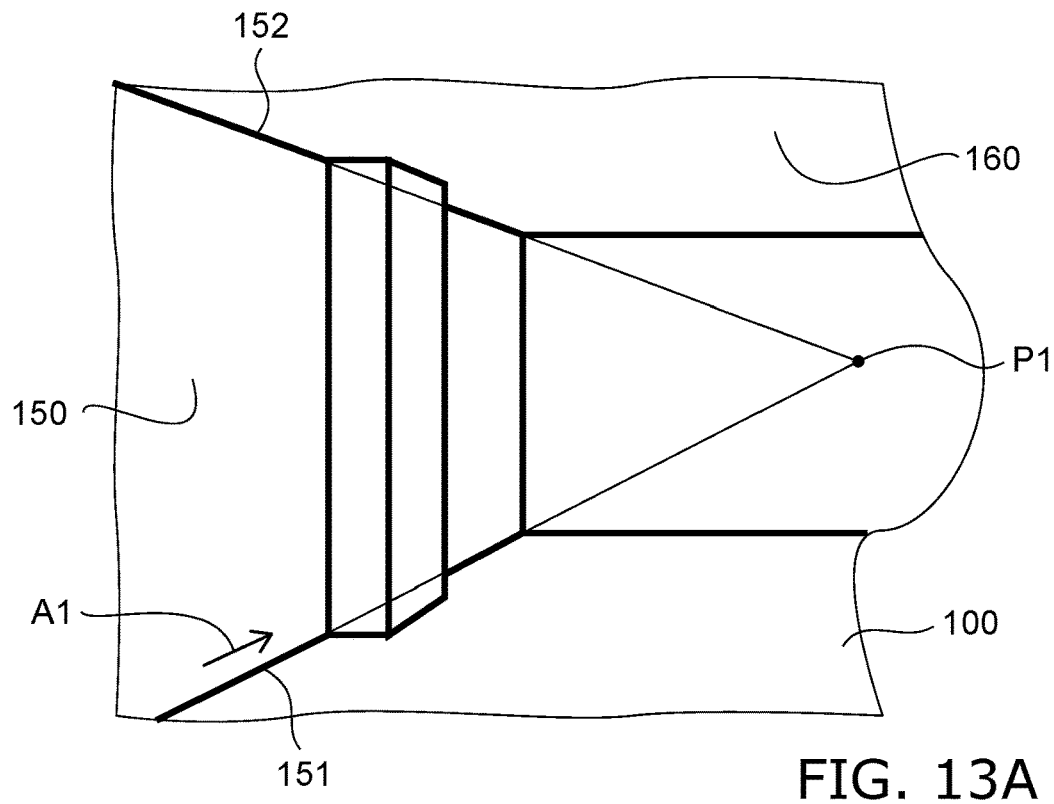
FIGS. 13A and 13B are schematic views for describing a fifth modified example of the reference direction of the present embodiment.
Figure 13B:
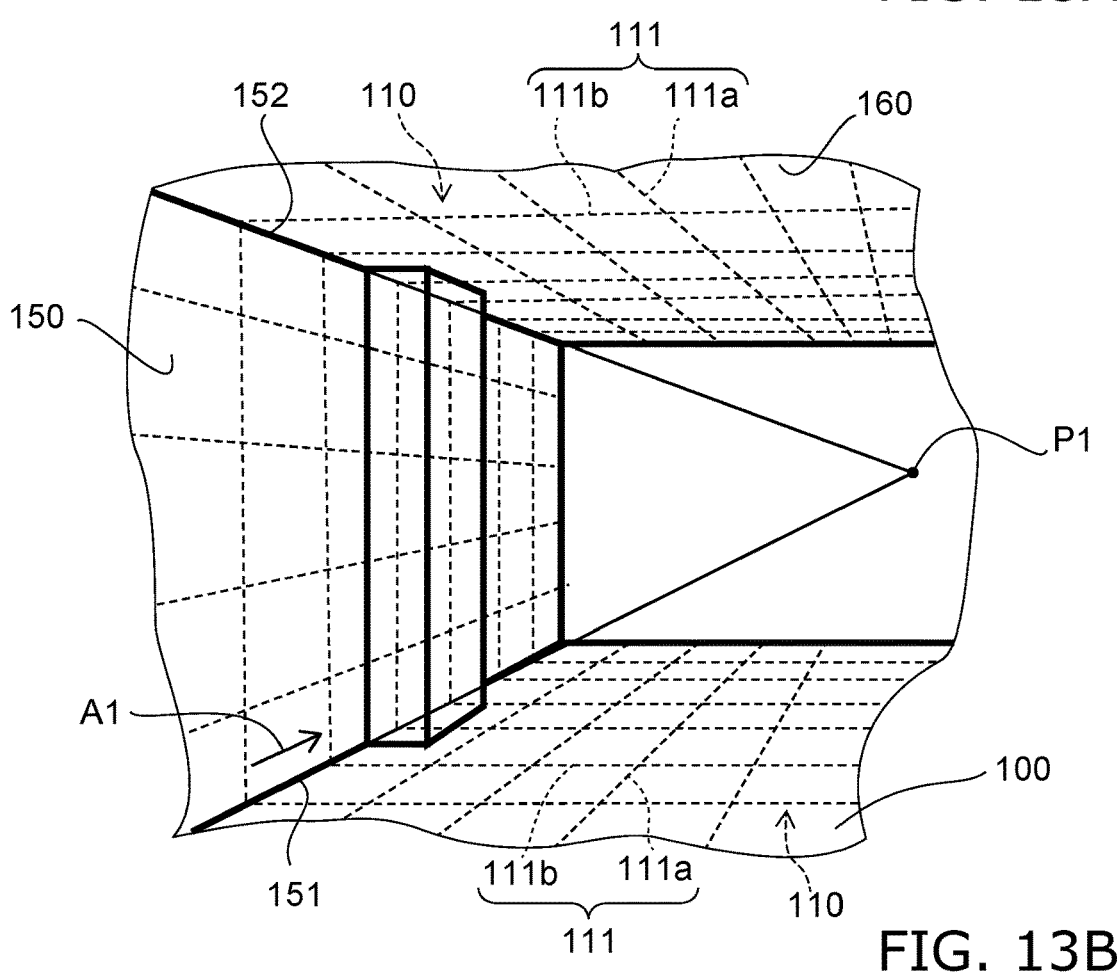

Next, a fifth modified example of the reference direction of the present embodiment will be described with reference to FIGS. 13A and 13B. In the present modified example, the computation control unit 19 calculates the vanishing point P1 of the boundary 151 between the measurement surface 100 and the lateral surface 150 adjacent to the measurement surface 100 and the boundary 152 between the ceiling surface 160 opposed to the measurement surface 100 and the lateral surface 150 on the basis of the image that has been acquired by the imaging unit 14 to set the reference direction. The vanishing point P1 may be calculated by, for example, line detection, image processing based on artificial intelligence (AI), or the like. Further, the computation control unit 19 finds the direction A1 of the lateral surface 150 while finding the measurement surface 100 and the ceiling surface 160 on the basis of the vanishing point P1. The computation control unit 19 sets the direction A1 of the lateral surface 150 as the reference direction.

According to the present modified example, the computation control unit 19 is capable of tracing the lines 111 of the grid 110 generated on the basis of the direction A1 of the lateral surface 150 and acquiring point group data at regular intervals on the measurement surface 100 and the ceiling surface 160 with respect to the measurement surface 100 and the ceiling surface 160 that have been found on the basis of the vanishing point P1. Thus, by calculating the vanishing point P1, the computation control unit 19 is capable of performing uniform examination on the measurement surface 100 and the ceiling surface 160 and shortening the examination time. For example, the measurement system 1 is capable of performing examination on a targeted measurement spot as in the case of the measurement of the diameter of a pipe arranged along the ceiling surface 160 or the lateral surface 150 such as a wall surface and shorten examination time.

The embodiments of the present invention are described above. However, the present invention is not limited to the above embodiments but may be modified in various ways without departing from claims. The configurations of the above embodiments may be partially omitted, or may be arbitrarily combined together in a manner different from those of the above embodiments.

What is claimed is:

1. A method comprising:
generating a measurement light;
emitting the generated measurement light;
controlling a deflection behavior of a deflection unit to scan a measurement target with the emitted measurement light, wherein the scan traces a grid generated having lines that are arranged on regular intervals on a surface of the measurement target and include a component parallel to a reference direction and a component perpendicular to the reference direction;
receiving reflection measurement light;
generating a light reception signal in response to receiving the reflection measurement light;
measuring a distance to the measurement target on a basis of the light reception signal; and
finding a surface of the measurement target.

2. The method of claim 1, wherein the scanning comprises deflecting the measurement light in a circumferential direction in relation to a prescribed center while deflecting an emission direction of the measurement light in relation to a reference optical axis.

3. The method of claim 2, further comprising:
setting a direction of the reference optical axis as the reference direction.

4. The method of claim 2, further comprising:
finding a direction of a lateral surface adjacent to the surface of the measurement target and sets the direction of the lateral surface as the reference direction.

5. The method of claim 2, further comprising:
finding a direction of a lateral surface while finding the surface of the measurement target by scanning a range crossing a boundary between the surface of the measurement target and the lateral surface adjacent to the surface of the measurement target with the measurement light; and
setting the direction of the lateral surface as the reference direction.

6. The method of claim 5, further comprising:
finding the direction of the lateral surface while finding an opposite surface opposed to the surface of the measurement target by further scanning a range crossing a boundary between the lateral surface and the opposite surface with the measurement light.

7. The method of claim 2, further comprising:
setting, as the reference direction, a direction of a line connecting a first point on the surface of the measurement target that is selected in order to find the surface of the measurement target and a second point on the surface of the measurement target that is selected at a position apart from the first point.

8. The method of claim 2, further comprising:
acquiring an image of the surface of the measurement target; and
calculating a vanishing point of a boundary between the surface of the measurement target and a lateral surface adjacent to the surface of the measurement target and a boundary between an opposite surface opposed to the surface of the measurement target and the lateral surface on a basis of the image acquired;
finding a direction of the lateral surface while finding the surface of the measurement target and the opposite surface on a basis of the vanishing point; and
setting the direction of the lateral surface as the reference direction.

9. The method of claim 1, further comprising:
finding a direction of a lateral surface adjacent to the surface of the measurement target; and
setting the direction of the lateral surface as the reference direction.

10. The method of claim 1, further comprising:
finding a direction of a lateral surface while finding the surface of the measurement target by scanning a range crossing a boundary between the surface of the measurement target and the lateral surface adjacent to the surface of the measurement target with the measurement light; and
setting the direction of the lateral surface as the reference direction.

11. The method of claim 10, further comprising:
finding the direction of the lateral surface while finding an opposite surface opposed to the surface of the measurement target by further scanning a range crossing a boundary between the lateral surface and the opposite surface with the measurement light.

12. The method of claim 1, further comprising:
setting, as the reference direction, a direction of a line connecting a first point on the surface of the measurement target that is selected in order to find the surface of the measurement target and a second point on the surface of the measurement target that is selected at a position apart from the first point.

13. The method of claim 1, further comprising:
acquiring an image of the surface of the measurement target; and
calculating a vanishing point of a boundary between the surface of the measurement target and a lateral surface adjacent to the surface of the measurement target and a boundary between an opposite surface opposed to the surface of the measurement target and the lateral surface on a basis of the image acquired;
finding a direction of the lateral surface while finding the surface of the measurement target and the opposite surface on a basis of the vanishing point; and
setting the direction of the lateral surface as the reference direction.

* * * * *